(12) United States Patent
Chen et al.

(10) Patent No.: US 10,523,318 B2
(45) Date of Patent: Dec. 31, 2019

(54) DEVICE AWARENESS IN LINE-OF-SIGHT OPTICAL COMMUNICATION SYSTEMS

(71) Applicant: Apple Inc., Cupertino, CA (US)

(72) Inventors: Tong Chen, Cupertino, CA (US); Mark T. Winkler, San Jose, CA (US); Wenrui Cai, San Jose, CA (US); Mehmet Mutlu, Stanford, CA (US); Omid Momtahan, Palo Alto, CA (US); Orit A. Shamir, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/399,943

(22) Filed: Apr. 30, 2019

(65) Prior Publication Data

US 2019/0372668 A1 Dec. 5, 2019

Related U.S. Application Data

(60) Provisional application No. 62/678,191, filed on May 30, 2018.

(51) Int. Cl.
| | |
|---|---|
| *H04B 10/112* | (2013.01) |
| *G02B 27/09* | (2006.01) |
| *H04L 5/00* | (2006.01) |
| *H04L 7/00* | (2006.01) |

(52) U.S. Cl.
CPC ..... *H04B 10/1123* (2013.01); *G02B 27/0955* (2013.01); *H04L 5/0055* (2013.01); *H04L 7/0075* (2013.01)

(58) Field of Classification Search
CPC ............ H04B 10/1123; G02B 27/0955; H04L 5/0055; H04L 7/0075

USPC ........................................................ 398/118
See application file for complete search history.

(56) References Cited

U.S. PATENT DOCUMENTS

| | | | |
|---|---|---|---|
| 5,808,760 A | 9/1998 | Gfeller | |
| 7,609,972 B2* | 10/2009 | Cunningham | ..... H04B 10/1123 398/118 |
| 7,830,575 B2 | 11/2010 | Moon et al. | |
| 8,251,517 B2 | 8/2012 | Gibson et al. | |

(Continued)

FOREIGN PATENT DOCUMENTS

WO WO 17/200948 11/2017

*Primary Examiner* — Dalzid E Singh
(74) *Attorney, Agent, or Firm* — Brownstein Hyatt Farber Schreck, LLP

(57) ABSTRACT

Techniques are disclosed by which electronic devices that include line-of-sight optical communication systems may become optically aware of other electronic devices and perform optical communication handshakes with other devices. An electronic device may use a motion sensor to record its posing when it determines, during the performance of an optical communication handshake, that it is pointed at the electronic device with which it is performing the optical communication handshake (or that the other electronic device is within a field of view of the electronic device). A recorded device posing, in combination with optical communications and motion sensor data, may also be used to map another device's location and enable a user of an electronic device to pan away from and break optical communication with the other device, then easily return to a recorded posing that enables a continuation of optical communications with the other device.

22 Claims, 16 Drawing Sheets

(56) References Cited

U.S. PATENT DOCUMENTS

| | | | |
|---|---|---|---|
| 8,391,719 B2 * | 3/2013 | Alameh | H04M 1/7253 |
| | | | 398/115 |
| 8,588,805 B2 | 11/2013 | Besoll et al. | |
| 9,485,745 B2 | 11/2016 | Kurby et al. | |
| 9,489,670 B2 | 11/2016 | McGill | |
| 10,043,282 B2 | 8/2018 | Smits | |
| 10,148,056 B2 | 12/2018 | Uyeno et al. | |
| 2008/0044188 A1 * | 2/2008 | Kagawa | H04B 10/1141 |
| | | | 398/128 |
| 2015/0172878 A1 | 6/2015 | Luna | |
| 2016/0047890 A1 * | 2/2016 | Ryan | G01C 21/206 |
| | | | 398/118 |
| 2017/0244490 A1 * | 8/2017 | Hallal | H04B 10/80 |
| 2017/0374244 A1 | 12/2017 | Swaminathan et al. | |
| 2018/0059221 A1 | 3/2018 | Slobodyanyuk et al. | |
| 2019/0034043 A1 * | 1/2019 | Zolotykh | H05B 37/02 |

* cited by examiner

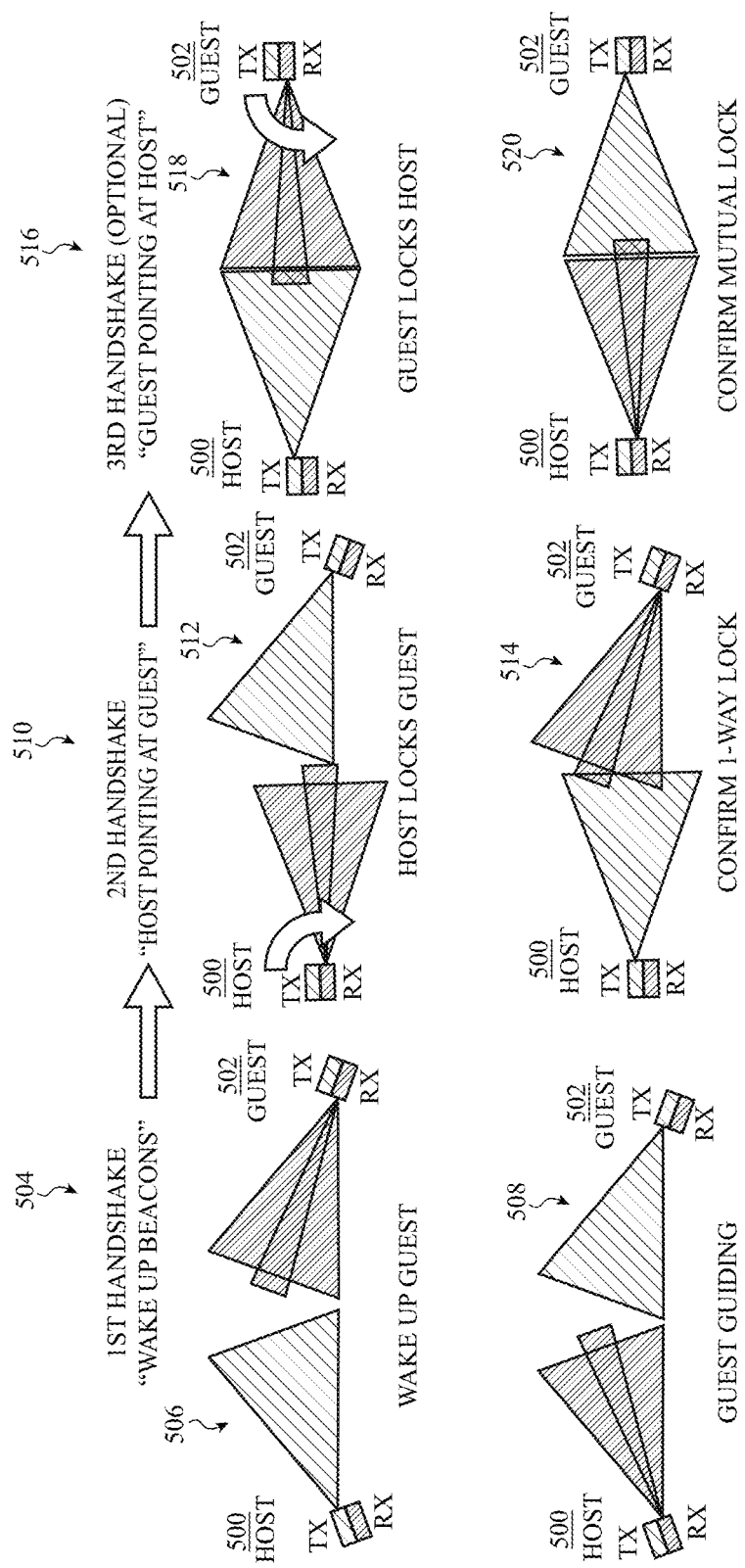

DEVICE AWARENESS IN LINE-OF-SIGHT OPTICAL COMMUNICATION SYSTEMS

CROSS-REFERENCE TO RELATED APPLICATION

This application is a nonprovisional of and claims the benefit under 35 U.S.C. 119(e) of U.S. Provisional Patent Application No. 62/678,191, filed May 30, 2018, and entitled "Device Awareness in Line-Of-Sight Optical Communication Systems," the contents of which are incorporated herein by reference as if fully disclosed herein.

FIELD

The described embodiments relate generally to line-of-sight optical communication systems. More particularly, the described embodiments relate to device awareness in line-of-sight optical communication systems, and to electronic devices that use optical communication systems in combination with motion sensors to provide device-to-device location awareness.

BACKGROUND

With the use of mobile electronic devices such as smart phones, tablet computers, and smart wearable devices becoming an indispensable part of modern life, device-to-device interaction is expected to become the seamless digital extension of ad-hoc interpersonal communication.

A prerequisite to device-to-device interaction is device-to-device awareness. Device-to-device awareness is defined herein as the capability of electronic devices to discover (identify), map, and track other electronic devices, typically in real time.

During device discovery, information such as a device identifier (ID), a hash key, and supported protocols may be exchanged with other electronic devices and verified. Device discovery enables further data exchange (sometimes in higher bandwidth channels than the channel(s) used for device discovery.) The Bluetooth Low Energy (BLE) handshake protocol is one example of a device discovery handshake protocol. Poor response time (handshake latency) has been an issue with BLE handshakes. For example, the low duty cycle and frequency hopping used in BLE handshakes has resulted in discovery times of up to ten seconds, coupled with another five seconds of paging time. Ideally, the device discovery process should be capable of being completed in less than a few (or couple) seconds.

SUMMARY

Embodiments of the systems, devices, methods, and apparatus described in the present disclosure are directed to line-of-sight optical communication systems, and techniques by which electronic devices that include line-of-sight optical communication systems may become optically aware of other electronic devices and perform optical communication handshakes with other devices. In described techniques for providing device awareness, an electronic device may use a motion sensor to record its posing when it determines, during the performance of an optical communication handshake, that it is pointed at the electronic device with which it is performing the optical communication handshake. A recorded device posing, in combination with optical communications and motion sensor data, may also be used to map another device's location and enable a user of an electronic device to pan away from and break optical communication with the other device, then easily return to a recorded posing that enables a continuation of optical communications with the other device.

In a first aspect, the present disclosure describes a mobile electronic device. The mobile electronic device may include an optical transmitter, an optical receiver, a motion sensor, and a processor. The optical transmitter may have an acute angular transmission space (a Field of Regard (FoR), and the optical receiver may have an acute angular reception space (a Field of View (FoV) that overlaps the acute angular transmission space. The processor may be configured to perform an optical communication handshake with a second electronic device. The optical communication handshake may be performed, using the optical transmitter and the optical receiver, when the second electronic device is within the acute angular transmission space and the acute angular reception space. The processor may also be configured to record a posing of the mobile electronic device when the mobile electronic device is determined to be pointing at the second electronic device while performing the optical communication handshake, and to compare a current posing of the mobile electronic device to the recorded posing of the mobile electronic device to determine when the mobile electronic device is posed to communicate with the second electronic device.

In another aspect, the present disclosure describes another mobile electronic device. The mobile electronic device may include an optical transmitter, a first optical receiver, a second optical receiver, a motion sensor, and a processor. The optical transmitter may have an acute angular transmission space. The first optical receiver may have a first acute angular reception space that overlaps a first portion of the acute angular transmission space. The second optical receiver may have a second acute angular reception space that overlaps a second portion of the acute angular transmission space. The second portion is different from the first portion, and the second portion partially overlaps the first portion within the acute angular transmission space. The processor may be configured to determine, using signals received from the first optical receiver and the second optical receiver, that a second electronic device is within the acute angular transmission space, the first acute angular reception space, and the second acute angular reception space. The processor may also be configured to perform an optical communication handshake with the second electronic device when the second electronic device is within the acute angular transmission space, the first acute angular reception space, and the second acute angular reception space. The processor may be further configured to record a posing of the mobile electronic device when the mobile electronic device is determined to be pointing at the second electronic device while performing the optical communication handshake, and to compare a current posing of the mobile electronic device to the recorded posing of the mobile electronic device to determine when the mobile electronic device is posed to communicate with the second electronic device.

In still another aspect of the disclosure, another mobile electronic device is described. The mobile electronic device may include an optical transmitter, an optical receiver, a motion sensor, and a processor. The optical transmitter may have a set of multiple different acute angular transmission spaces, and the optical receiver may have a set of multiple different acute angular reception spaces. Each acute angular reception space may overlap one of the acute angular transmission spaces. The processor may be configured to perform an optical communication handshake with a second electronic device by transmitting in an acute angular transmission space including the second electronic device, and receiving in an acute angular reception space that overlaps the acute angular transmission space. The processor may also be configured to record a posing of the mobile electronic device and an identity of at least the acute angular transmission space or the acute angular reception space while performing the optical communication handshake is performed, and to compare a current posing of the mobile electronic device to the recorded posing of the mobile electronic device to determine when the mobile electronic device is posed to communicate with the second electronic device.

In another aspect of the disclosure, a method performed by a first electronic device to optically communicate with a second electronic device is described. The method may include performing an optical communication handshake with the second electronic device; recording a posing of the first electronic device while performing the optical communication handshake; and comparing a current posing of the first electronic device to the recorded posing of the first electronic device to determine when the first electronic device is posed to communicate with the second electronic device.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIG. 5 shows an example series of optical communication handshakes that may be performed between a pair of electronic devices;

Figure 1:
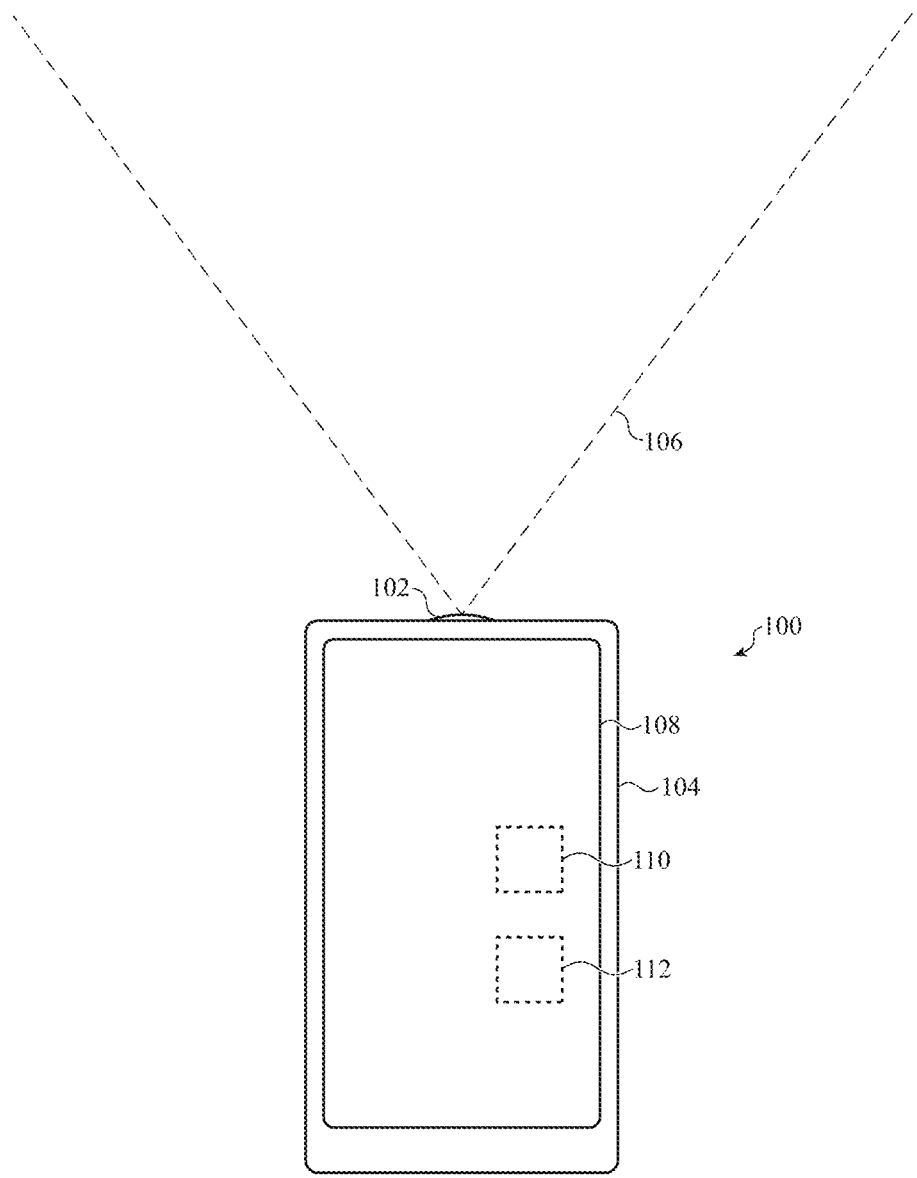
FIG. 1 shows an example of an electronic device having a line-of-sight optical communication system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

As previously mentioned, device awareness (or device-to-device awareness) is a prerequisite to device-to-device interaction. Device-to-device location awareness can also be useful, as it can enable electronic devices to be associated with their owners in context (e.g., when using smart phones to communicate in private around a conference room table, when navigating amongst motor vehicles on a highway, when communicating with smart appliances in a home or office, and so on), and may enable certain functionality in interactive applications (e.g., an ability to locate other players in an augmented reality game). There are several levels of device-to-device location awareness in terms of dimensions and accuracy, from basic proximity to high resolution (hi-res) three-dimensional (3-D) locating and posing. Far field radio frequency (RF) technologies such as global positioning system (GPS) technologies, cellular communication technologies, and Wi-Fi communication technologies triangulate device location at the expense of heavy infrastructure investment. Near-field RF technologies such as BLE and near-field communication (NFC) are self-sustainable (e.g., do not require heavy infrastructure investment) but provide limited proximity information. Huge engineering efforts have been spent on RF "beamforming" technologies for next generation, power efficient, spatially targeted communication platforms (e.g., fifth generation (5G) wireless systems). However, there are challenges associated with the high modulation frequencies and compact mobile form factor of 5G wireless systems. RF communication technologies also tend to operate in broadcast mode during device discovery, and can penetrate walls and exceed defined spaces (such as rooms) throughout the course of device-to-device communication.

The electronic devices described herein may obtain device-to-device location awareness using a line-of-sight optical communication system, and may maintain device-to-device location awareness by recording device posings using a motion sensor. Line-of-sight optical communication technologies can provide more intimacy and better security than RF communication technologies. Line-of-sight optical communication technologies can also operate in a narrower field of view during all phases of communication, and can be limited to a confined space by walls or other obstructions that limit a device's line-of-sight or field of view.

The optical communication systems employed by the electronic devices described in the present disclosure may be single, dual, or multiple channel optical communication systems. The optical communication systems may be used to perform optical communication handshakes with other electronic devices, and may use a motion sensor to record a posing of the electronic device while performing an optical communication handshake. The recorded posing may enable a processor of the electronic device to determine when the electronic device is posed to communicate with the other electronic device (e.g., pointed at the other electronic device, or oriented such that the other electronic device is within an optical communication space of the electronic device). Recorded posings of other electronic devices may also help the processor to distinguish the other electronic devices. In some embodiments, a posing cue (or cues) may be provided to a user of the electronic device. A posing cue may guide the user on how to return their electronic device to a recorded posing to optically communicate with another electronic device, and in some cases may identify (or map) the other electronic device or its user. A posing cue may, for example, take the form of an icon displayed on a display, a haptic correction or confirmation, or an audio notification (e.g., a sound or a tune).

In embodiments in which an electronic device has a single channel optical communication system, mutual pointing may be required to perform an optical communication handshake between the devices. That is, it may be necessary for the first electronic device to point an optical transceiver toward the second electronic device and vice versa.

In embodiments in which an electronic device has a dual receive channel optical communication system with partially overlapping receive channels, mutual pointing may be required to perform an optical communication handshake between the devices, but signals received by a pair of optical receivers (corresponding to the dual receive channels) may be used to more readily determine when an electronic device is pointed at another electronic device. That is, it may be determined that an electronic device is pointed at another electronic device when the electronic device receives signals of relatively equal power, from the other electronic device, at both of its optical receivers.

In embodiments in which an electronic device has a multiple channel optical communication system, the electronic device may employ spatial-temporal multiplexing to communicate with multiple other electronic devices. In some cases, the spatial-temporal multiplexing may include sequentially cycling through transmissions in different optical communication spaces, and separate from the transmission cycling, simultaneously receiving any transmissions from the different optical communication spaces. In some cases, an electronic device may employ spatial-temporal multiplexing of optical communication channels, in combination with motion sensing, to obtain near instantaneous optical awareness of other devices and their locations, and to obtain data link information for the other devices.

In each of the above embodiments, an electronic device may remain in a low duty cycle "sniff" mode, in which it monitors for optical wake up signals transmitted by other devices, until it receives a wake up signal from another device or determines to wake up other devices itself. The electronic device may switch over to a higher duty cycle active mode upon receiving a wake up signal from another device, or upon determining that it needs to transmit (or has been requested to discover other devices) itself.

These and other embodiments are discussed with reference to FIGS. 1-8. However, those skilled in the art will readily appreciate that the detailed description given herein with respect to these figures is for explanatory purposes only and should not be construed as limiting.

FIG. 1 shows an example of an electronic device 100 having a line-of-sight optical communication system 102. In some embodiments, the optical communication system 102 may include an optical transmitter and an optical receiver (i.e., an optical transceiver) mounted on or near an edge of an enclosure 104 of the electronic device 100.

The line-of-sight optical communication system 102 may have an acute angular communication space 106 (or field of view (FoR/FoV)). As used herein, an acute angular communication space, including an acute angular transmission and/or acute angular reception space, is a communication space that spans an acute angle (i.e., an angle of less than 90 degrees) with respect to an x-y coordinate plane associated with an electronic device (e.g., with respect to a coordinate plane that passes through or near an edge of an electronic device and is perpendicular to a major surface (e.g., a front surface or back surface) of the electronic device. For the electronic device 100, and in some embodiments, the coordinate plane may pass through or near a top edge of the electronic device 100 and be perpendicular to the front surface of the electronic device 100. The coordinate plane may be chosen such that the acute angular communication space 106 for the electronic device 100 has a horizontal angular extent (or substantially horizontal angular extent)

when the electronic device 100 is placed on a horizontal surface or held in a user's hand. In some embodiments, the acute angular communication space 106 may have an angular extent of less than 45 degrees, or less than 30 degrees, or between 10 and 15 degrees. A narrower angular communication space may enable the electronic device 100 to more precisely determine a direction or location of another electronic device, and may improve the security of optical communications. A wider angular communication space may enable the electronic device 100 to more easily discover another electronic device. In some embodiments, the electronic device may have multiple acute angular communication spaces, and may be able to separately transmit and receive in each of the acute angular communication spaces. The acute angular communication space 106 may have a wider angular extent in an orthogonal direction (e.g., in a vertical direction).

A display 108 on a front surface of the electronic device 100 may display the identities and locations of other electronic devices discovered by the electronic device 100. The display 108 may also display information received from other electronic devices and/or provide a means for inputting information to be sent to other electronic devices.

In some embodiments, the electronic device 100 may include a motion sensor 110. The motion sensor 110 may be positioned in or on the electronic device 100 (e.g., in or on the enclosure 104), and may be used to record posings of the electronic device 100. For example, when the electronic device 100 optically discovers another electronic device, by means of optically communicating with the other electronic device using the optical communication system 102, the motion sensor 110 may record a posing of the electronic device 100 that enabled the optical communication to occur. If the posing of the electronic device 100 is then changed, a processor 112 within the electronic device 100 may compare a current posing of the electronic device 100 to the recorded posing to determine whether the electronic device 100 is posed to communicate with the other electronic device.

Figure 2:
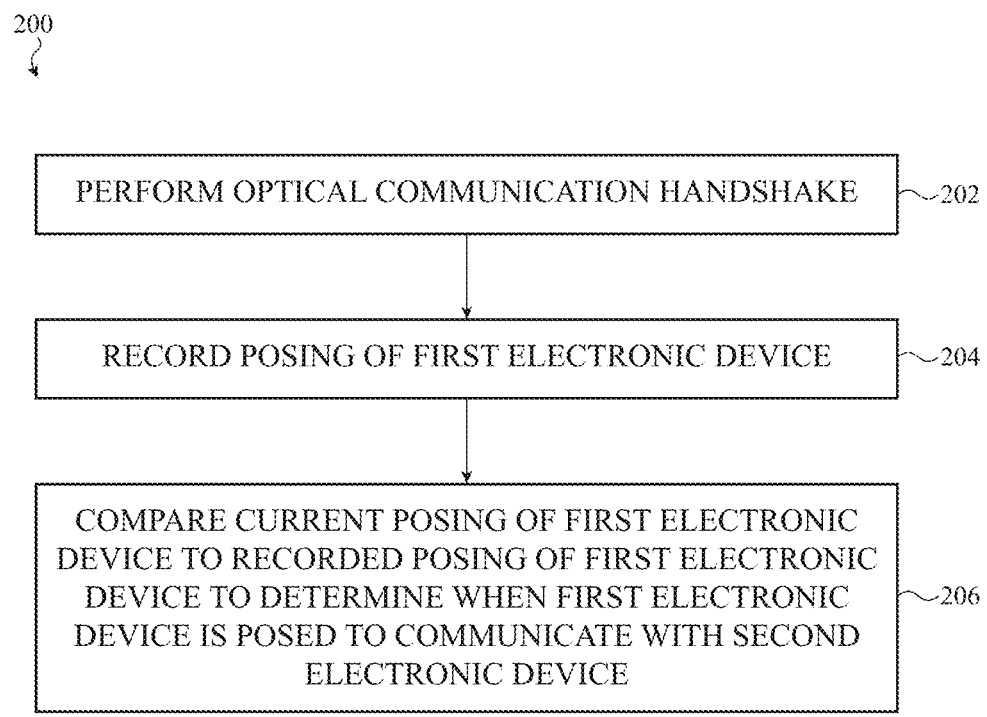
FIG. 2 shows an example of a method performed by a first electronic device to optically communicate with a second electronic device.

FIG. 2 shows an example of a method 200 performed by a first electronic device to optically communicate with a second electronic device. In some embodiments, each of the electronic devices may be configured similarly to the electronic device 100 described with reference to FIG. 1.

At block 202, the method 200 may include performing an optical communication handshake with the second electronic device. In embodiments in which the first electronic device is an initiator of optical communications, and as described in greater detail with reference to FIGS. 3F & 6A, performing the optical communication handshake may include optically transmitting a periodic synchronization signal; optically receiving from the second electronic device an acknowledgement of receiving the periodic synchronization signal; and optically transmitting to the second electronic device, during a window of time allocated for the periodic synchronization signal, a second acknowledgement.

In embodiments in which the first electronic device is responsive to an initiator of optical communications, and as described in greater detail with reference to FIGS. 3F & 6A, performing the optical communication handshake may include optically monitoring for a synchronization signal at a low duty cycle; optically detecting the periodic synchronization signal during a first window of time for performing the optical monitoring; at a second window of time for performing the optical monitoring, measuring a duration to an end of an instance of the synchronization signal; synchronizing with the second electronic device and switching to a high duty cycle for optically communicating with the second electronic device in response to the measured duration; optically transmitting to the second electronic device an acknowledgement of receiving the periodic synchronization signal; and optically receiving from the second electronic device, during a third window of time allocated for the periodic synchronization signal, a second acknowledgement.

At block 204, the method 200 may include recording a posing of the first electronic device while performing the optical communication handshake. In some cases, the posing may be a static posing. In some cases, the posing may include a sequence of posing or motion tracking information.

At block 206, the method 200 may include comparing a current posing of the first electronic device to the recorded posing of the first electronic device to determine when the first electronic device is posed to communicate with the second electronic device.

In some embodiments of the method 200, the recorded posing may be used to provide a posing cue to a user of the first electronic device. The posing cue may guide a user of the first electronic device on how to return to the recorded posing to optically communicate with the second electronic device. For example, the posing cue may include an icon displayed on a display of the first electronic device, and the location of the icon on the display may be updated when the user moves the first electronic device. In this manner, the user may use the location of the icon to determine when the first electronic device is pointed at the second electronic device, or to determine when the second electronic device is within an optical field of view of the first electronic device. Alternatively or additionally, the posing cue may include a haptic notification or correction that lets the user tactically know when the first electronic device is pointed at the second electronic device (or when the second electronic device is within the optical field of view of the first electronic device). The posing cue may also include an audio notification.

In some embodiments of the method 200, an identifier of the second electronic device may be received while performing the optical communication handshake. In these embodiments, a location of the second electronic device may be mapped using the received identifier of the second electronic device and the recorded posing of the first electronic device. The mapped location of the second electronic device may be displayed on a display of the first electronic device, and may be updated when the first electronic device is moved.

In some embodiments of the method 200, at least the first electronic device may optically communicate in different acute angular optical communication spaces (and in some cases, both of the electronic devices may communicate in different acute angular optical communication spaces).

In some embodiments, the method 200 may further include determining a coarse range to the second electronic device. The coarse range may be determined, for example, based on an evaluation of strengths/powers of signals received from the second electronic device (and/or based on an evaluation of strengths/powers of signals measured by the second electronic device and reported to the first electronic device).

The determined distance may further aid the first electronic device in mapping the location of the second electronic device and/or providing a posing cue to the user of the first electronic device.

Figure 3A:
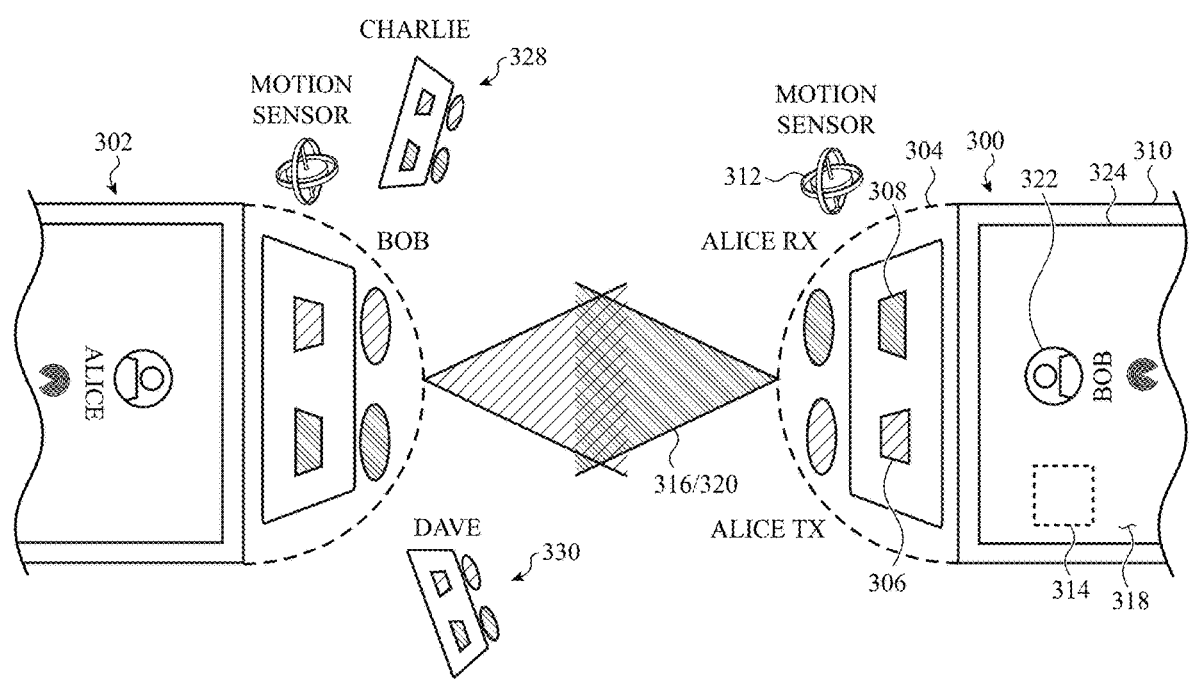
FIG. 3A shows an example of an electronic device communicating with another electronic device using a single channel line-of-sight optical communication system.

FIG. 3A shows an example of an electronic device 300 (e.g., Alice's device, which may be a mobile electronic device) communicating with another electronic device 302 (e.g., Bob's device, which may be a mobile electronic device or a stationary electronic device) using a single channel line-of-sight optical communication system 304. By way of example, the electronic device 300 is shown to be a smart phone, but the electronic device 300 could alternately be a tablet computer, wearable device (e.g., a watch), or other type of electronic device (or a system having an electronic subsystem). For ease of explanation, optical communication systems are shown apart from their respective electronic devices in FIG. 3A (e.g., optical communication system 304 is shown apart from the electronic device 300). In actual devices, the optical communication systems would be incorporated into or onto their respective electronic devices.

The optical communication system 304 may include an optical transmitter 306 and an optical receiver 308. The optical communication system 304 may emit electromagnetic radiation (e.g., visible or invisible light (e.g., IR light)) using the optical transmitter 306, and may receive electromagnetic radiation using the optical receiver 308. In some embodiments, the optical transmitter 306 and optical receiver 308 may be disposed in or on an enclosure 310 of the electronic device 300 (e.g., near an edge of the electronic device 300). The electronic device 300 may also include a motion sensor 312 and a processor 314. For ease of explanation, motion sensors are also shown apart from their respective electronic devices in FIG. 3A (e.g., motion sensor 312 is shown apart from the electronic device 300).

The optical transmitter 306 may have an acute angular transmission space 316 (or FoR). As used herein, an acute angular transmission or reception space is a transmission or reception space that spans an acute angle (i.e., an angle of less than 90 degrees) with respect to an x-y coordinate plane associated with an electronic device (e.g., with respect to a coordinate plane that passes through or near an edge of an electronic device and is perpendicular to a major surface (e.g., a front or back surface) of the electronic device. For the electronic device 300, and in some embodiments, the coordinate plane may pass through or near a top edge of the electronic device 300 and be perpendicular to the front surface 318 of the electronic device 300. The coordinate plane may be chosen such that an acute angular transmission or reception space for the electronic device has a horizontal angular extent (or substantially horizontal angular extent) when the electronic device is placed on a horizontal surface or held in a user's hand. In some embodiments, the acute angular transmission space 316 may have an angular extent of less than 45 degrees, or less than 30 degrees, or between 10 and 15 degrees. A narrower angular transmission or reception space may enable an electronic device to more precisely determine a direction or location of another electronic device, and may improve the security of optical communications. A wider angular transmission or reception space may enable an electronic device to more easily discover another electronic device.

The optical receiver 308 may have an acute angular reception space 320. The acute angular reception space 320 may overlap the acute angular transmission space 316, and in some cases may be the same space (or substantially the same space) as the acute angular transmission space 316 (e.g., as shown in FIG. 3A).

In some embodiments, the motion sensor 312 may include an accelerometer, gyroscope, or magnetometer. The motion sensor 312 may also include a processor in some embodiments. The processor 314 may control some or all of the operations of the electronic device 300, and may communicate directly or indirectly with some or all of the other components of the electronic device 300. The processor 314 may be a singular processor, or may include different components for performing the same or different functions.

The processor 314 may be configured to perform an optical communication handshake with another electronic device (i.e., a second electronic device) when the other electronic device is within the acute angular transmission space 316 and the acute angular reception space 320. In some embodiments, the other electronic device may be the electronic device 302. The electronic device 302 may have an optical communication system configured the same or similarly to the optical communication system 304 of the electronic device 300. The optical communication handshake may enable the electronic device 300 to optically communicate with the electronic device 302. In some examples, the electronic devices 300, 302 may enable their users to communicate while seated around a conference table or mingling in a room. In other examples, the electronic devices 300, 302 may be navigation systems of nearby motor vehicles. In still other examples, the electronic device 300 may be a smart phone or remote controller, and the electronic device 302 may be a stationary appliance or controller that the electronic device 300 may communicate with to control one or more of an appliance, lighting, heating, an alarm system, and so on.

The processor 314 may also be configured to record a posing of the electronic device 300 when the electronic device 300 is determined to be pointing at the second electronic device 302 while performing the optical communication handshake, and to compare a current posing of the electronic device 300 to the recorded posing of the electronic device 300 to determine when the electronic device 300 is posed to communicate with the electronic device 302. The posing may be determined using one or more signals provided by the motion sensor 312, and may include, for example, a heading angle of the electronic device 300 or a directional location of the electronic device 302. In some embodiments, the electronic device 300 may store the recorded posing indefinitely, or until the electronic device 300 determines a new posing that enables the electronic device 300 to optically communicate with the electronic device 302. In some embodiments, the electronic device 300 may discard or clear the recorded posing after the electronic device 300 has been maintained in the recorded posing for a period of time but has been unable to re-establish optical communication with the electronic device 302.

In some embodiments, the processor 314 may be configured to provide a posing cue to a user of the electronic device 300. The posing cue may guide a user of the electronic device 300 on how to return the electronic device 300 to the recorded posing to optically communicate with the second electronic device 302.

In some embodiments, the posing cue may take the form of a relative position of an icon 322 on a display 324 of the electronic device 300. The icon 322 may identify the second electronic device 302 or its user (e.g., Bob), and may change position on the display 324 as a user moves the electronic device 300 with respect to the second electronic device 302. In some embodiments, a reference for interpreting the second electronic device's direction or location with respect to the electronic device 300 may be displayed on the display 324. For example, the walls of a room in which the electronic devices 300, 302 are located may be displayed on the display 324 of the electronic device 300. Additionally or alternatively, the processor 314 may cause a haptic output system of the electronic device 300 to deliver haptic posing cues to a user. The haptic posing cues may indicate when a user has pointed the optical communication system 304 of the electronic device 300 toward the second electronic device 302, and in some cases may include different posing cues based on whether the electronic device 300 is pointed in a direction that is closer to or farther from the direction of the second electronic device 302. The processor 314 may also cause a speaker of the electronic device 300 to provide a posing cue in the form of an audio notification.

Optical communication between the electronic devices 300, 302 depends on mutual pointing. That is, each electronic device 300, 302 needs to be pointed toward the other electronic device. If the electronic device 300 is moved to point toward the electronic device 328 or 330 of Charlie or Dave, and the electronic device 328 or 330 of Charlie or Dave is pointed at the electronic device 300 (i.e., the electronic device of Alice), then the electronic device 300 may perform an optical communication handshake with one of these other electronic devices 328, 330 and communicate with one of these other electronic devices 328, 330. When a posing of each discovered electronic device is recorded by the electronic device 300, the user of the electronic device 300 may receive and respond to cues (e.g., visual, haptic, and/or audio cues) provided by the electronic device 300 to return to a posing that enables the electronic device 300 to communicate with a particular other electronic device.

Figure 3B:
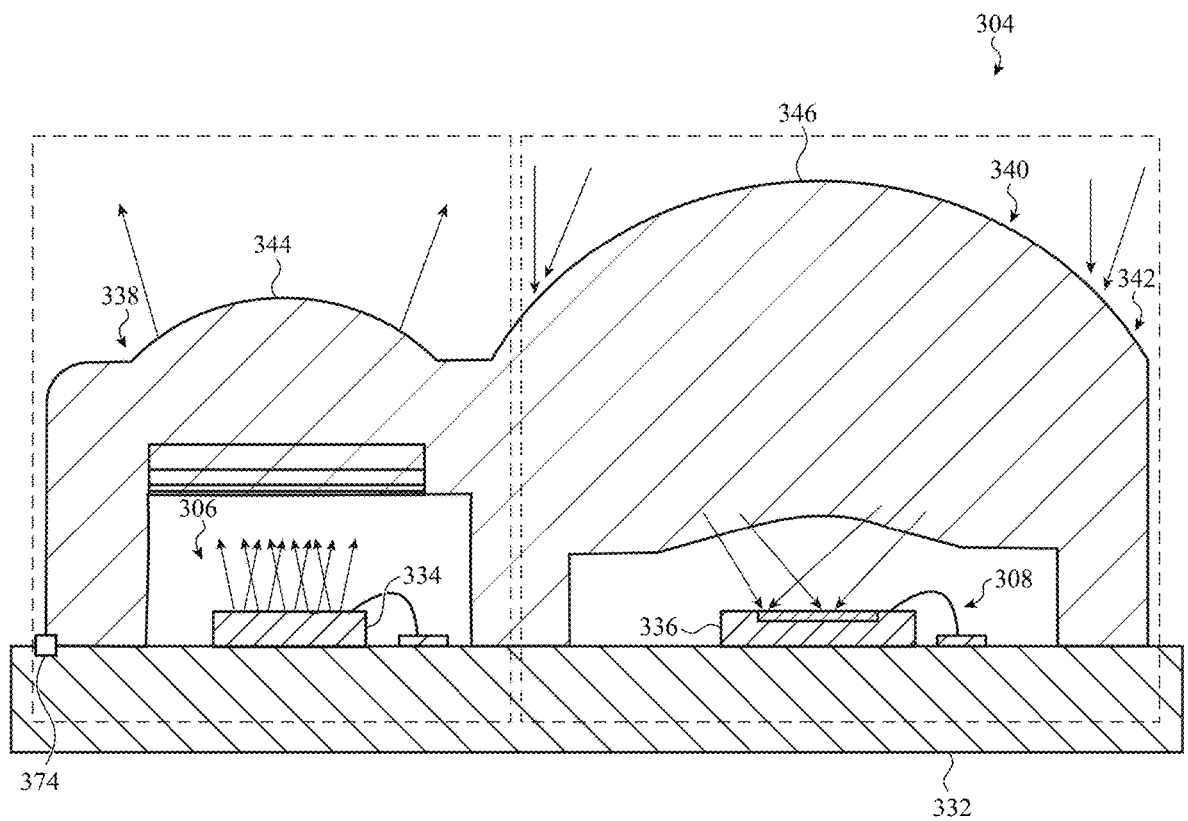
FIG. 3B shows an example implementation of components that may be included in the single channel line-of-sight optical communication system described with reference to FIG. 3A.

FIG. 3B shows an example implementation of components that may be included in the single channel line-of-sight optical communication system 304 described with reference to FIG. 3A. As shown, the optical transmitter 306 and optical receiver 308 may be mounted on a substrate 332 such as a printed circuit board (PCB). By way of example, the optical transmitter 306 may emit electromagnetic radiation (e.g., visible or invisible light (e.g., IR light)), and in some cases may include a set of light sources 334 including a vertical-cavity surface-emitting laser (VCSEL), a vertical external-cavity surface-emitting laser (VECSEL), or a light-emitting diode (LED) (e.g., an organic LED (OLED), a resonant-cavity LED (RC-LED), a micro LED (mLED), a superluminescent LED (SLED), and so on). In some embodiments, the optical transmitter 306 may include an array of light sources (e.g., an array of IR light sources, such as an array of IR VCSELs). The optical receiver 308 may receive electromagnetic radiation, and in some cases may include a photodetector 336.

A set of optics may be disposed in at least one of an optical transmit path of the optical transmitter 306 or an optical receive path of the optical receiver 308. For example, a set of transmit beam shaping optics 338 may be disposed over the optical transmitter 306, and a set of receive beam collection optics 340 may be disposed over the optical receiver 308. The set of optics may provide the overlap between the acute angular transmission space 316 and acute angular reception space 320 described with reference to FIG. 3A.

In some embodiments, some or all of the optics included in the set of transmit beam shaping optics 338 and the set of receive beam collection optics 340 may be incorporated into (i.e., formed in or included in) a monolithic dielectric 342 (i.e., a single structure). Incorporation of some or all of the optics included in the set of transmit beam shaping optics 338 and the set of receive beam collection optics 340, into the monolithic dielectric 342, may reduce cost and improve optics alignment accuracy. In some embodiments, the monolithic dielectric 342 may be a molded plastic structure. The monolithic dielectric 342 may be mounted to (e.g., adhesively bonded to) the substrate 332. In some embodiments, one or more electrical interlocks, such as electrical interlock 374, may be provided between the substrate 332 and the monolithic dielectric 342 (or if the set of transmit beam shaping optics 338 and the set of receive beam collection optics 340 are not incorporated into a monolithic dielectric 342, between the substrate 332 and the set of transmit beam shaping optics 338). In this manner, should the set of transmit beam shaping optics 338 become dislodged from the substrate 332 and light emitted by the light sources 334 potentially represent an eye hazard, the dislodgement may be detected and the light sources 334 may be powered down immediately upon the dislodgement being detected.

In some embodiments, the set of transmit beam shaping optics 338 may include an anamorphic lens 344 having different focal lengths and working distances in orthogonal directions (e.g., horizontal and vertical directions). The different focal lengths and working distances may, together with the emission area of the light sources 334, define the acute angular transmission space 316 (or angular aspect ratio) described with reference to FIG. 3A. In some cases, the working distances of the anamorphic lens 344 may be set to about 0.6-0.8× of the focal lengths to achieve a "soft-image" for the optical transmitter 306 near field. This may enable a well-defined uniform illumination, independent of optical variation in the optical transmitter 306, to be obtained far field.

In some embodiments, the set of receive beam collection optics 340 may include an aspheric lens 346 having a high numerical aperture. The aspheric lens 346 may have a positive optical power (e.g., a strong positive optical power) on a light-receiving surface (e.g., on an exterior surface of the monolithic dielectric 342), and a negative optical power (e.g., a moderate negative optical power) on a light-emitting surface (e.g., on an optical receiver-facing surface of the monolithic dielectric 342). The strong positive optical power on the light-receiving surface of the aspheric lens 346 may convert incident angles of light received on the light-receiving surface to different image heights on the photodetector 336. The moderate negative optical power on the light-emitting surface of the aspheric lens 346 may correct for field aberration.

The photodetector 336 may include (or be associated with) a narrow-band spectral filter that targets (passes) a wavelength of electromagnetic radiation emitted by the light sources 334 of the optical transmitter 306. The narrow-band spectral filter may be in the optical receive path of the optical receiver 308 (or photodetector 336). The photodetector 336 may have an angular aspect ratio matching that of the optical transmitter 306, and may be placed at a distance shorter than the focal plane of the aspheric lens 346, to minimize field aberration.

Figure 3C:
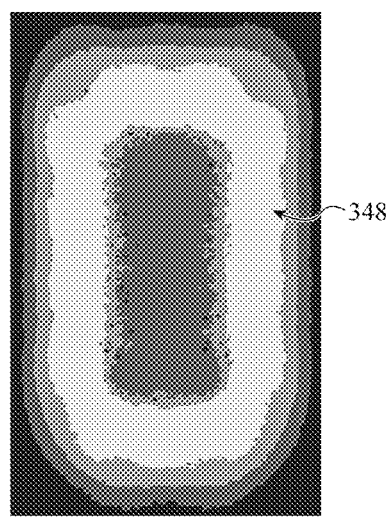
FIG. 3C shows an example far-field electromagnetic radiation distribution pattern that may be produced by the optical transmitter and set of transmit beam shaping optics described with reference to FIG. 3B.

FIG. 3C shows an example far-field electromagnetic radiation distribution pattern 348 that may be produced by the optical transmitter 306 and set of transmit beam shaping optics 338 described with reference to FIG. 3B. The far-field electromagnetic radiation distribution pattern 348 may have a high aspect ratio, with light diverging to a greater extent in one direction (e.g., a vertical direction) than in an orthogonal direction (e.g., a horizontal direction). In some embodiments, the set of transmit beam shaping optics 338 described with reference to FIG. 3B may shape the beam of light emitted by the optical transmitter 306 in two orthogonal directions (e.g., narrowing the beam in a horizontal direction, and widening the beam (i.e., causing it to diverge) in a vertical direction).

Figure 3D:
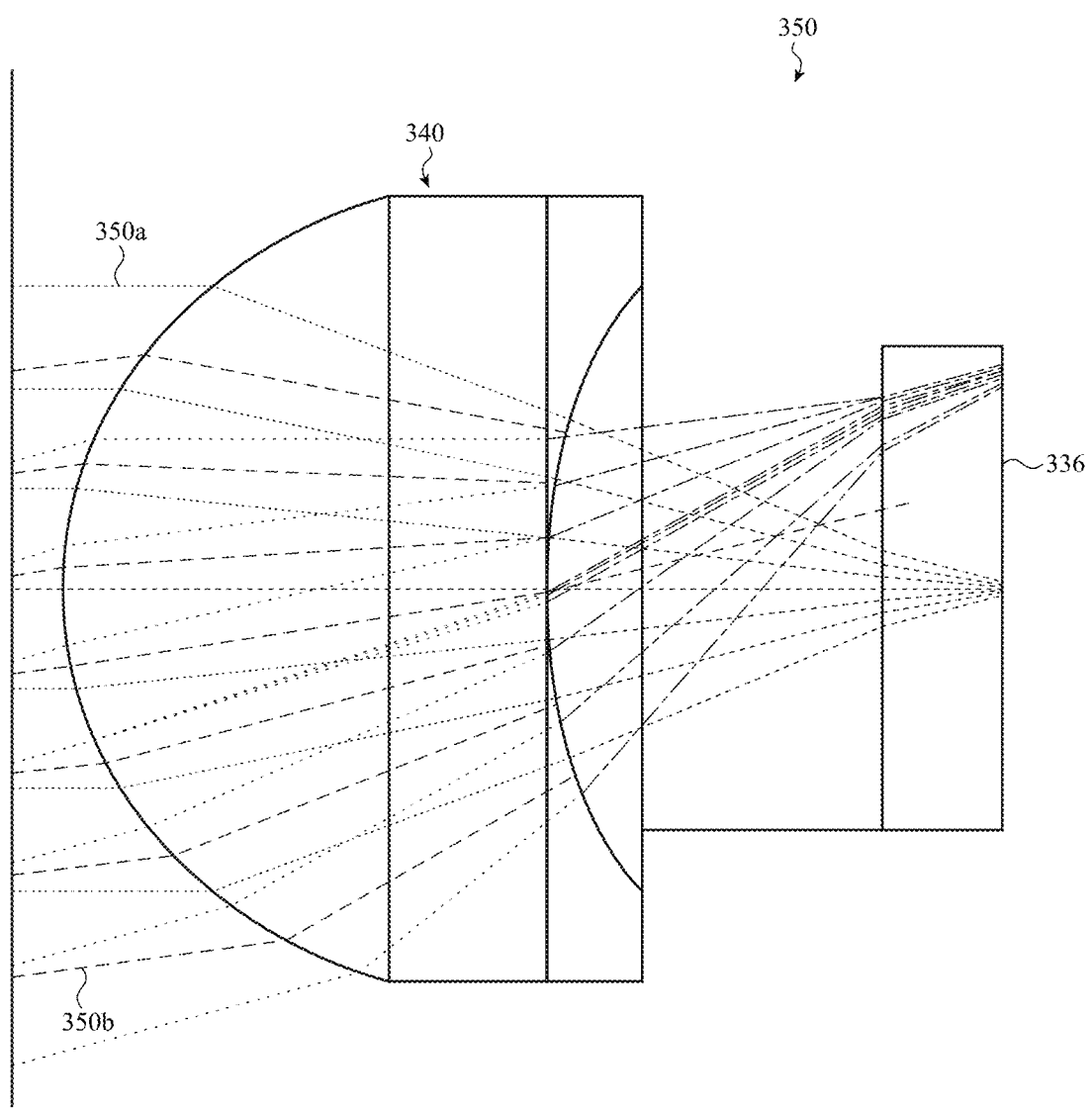
FIG. 3D shows an example ray trace through the set of receive beam collection optics described with reference to FIG. 3B.

FIG. 3D shows an example ray trace 350 through the set of receive beam collection optics 340 described with reference to FIG. 3B. As shown, the set of receive beam collection optics 340 may convert incident angles of received light 350a, 350b to different image heights on the photodetector 336. The photodetector 336 may be placed at a "soft focus" position, which is closer than the focal plane of the set of receive beam collection optics 340. In combination with the positive-negative optical power arrangement of the set of receive beam collection optics 340, field aberration may be minimized, and received light 350a and 350b arriving from different incident angle spaces may have uniform beam sizes on the surface of the photodetector 336.

Figure 3E:
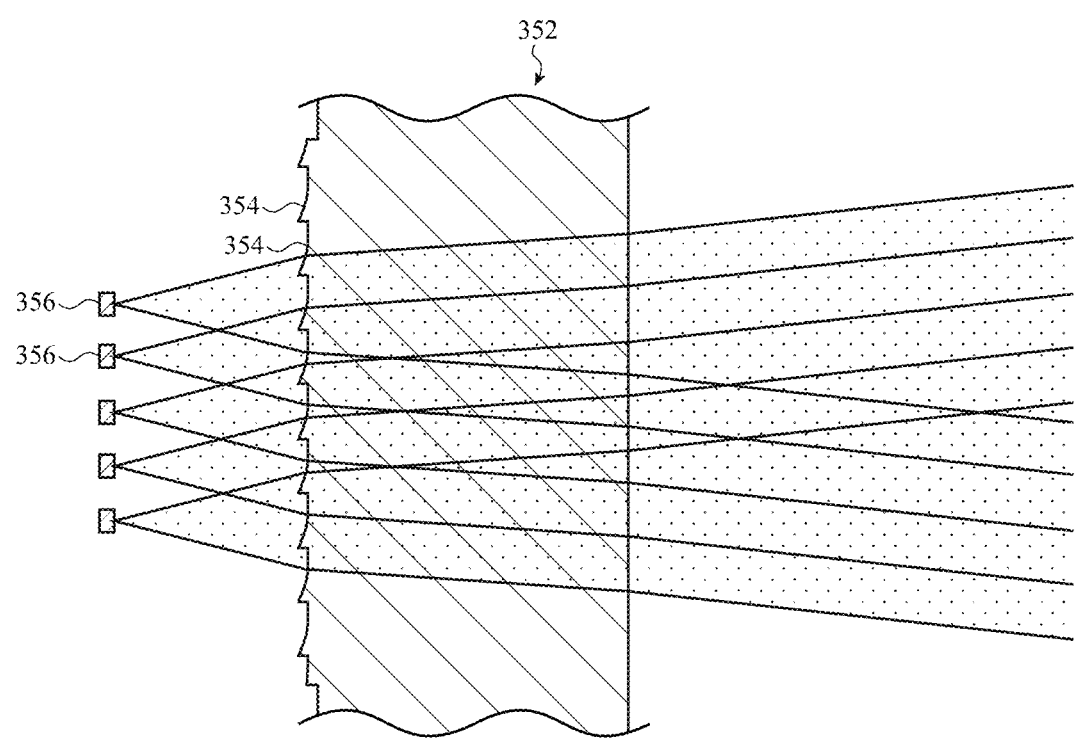
FIG. 3E shows an example alternative set of transmit beam shaping optics that may be used in the line-of-sight optical communication system described with reference to FIG. 3A or 3B.

FIG. 3E shows an example alternative set of transmit beam shaping optics 352 that may be used in the line-of-sight optical communication system 304 described with reference to FIG. 3A or 3B. The transmit beam shaping optics 352 may be used instead of the set of transmit beam shaping optics 338. The transmit beam shaping optics 352 includes a set of identical micro-optics 354, arranged laterally with respect to a set of light sources 356. A micro-optic (or set of micro-optics) may be disposed over each light source 356 (e.g., in a 1-to-1 correspondence). In some embodiments, the set of micro-optics 354 may provide more precise beam shaping than the set of transmit beam shaping optics 338 described with reference to FIG. 3B (but possibly at the expense of more stringent manufacturing and assembly tolerances).

In yet another embodiment, the set of transmit beam shaping optics 352 may be replaced by a diffractive optical element (DOE) in planary optical form. A DOE can be assembled with looser assembly tolerances compared to refractive optics (but possibly at the expense of reduced transmissive throughput).

Figure 3F:
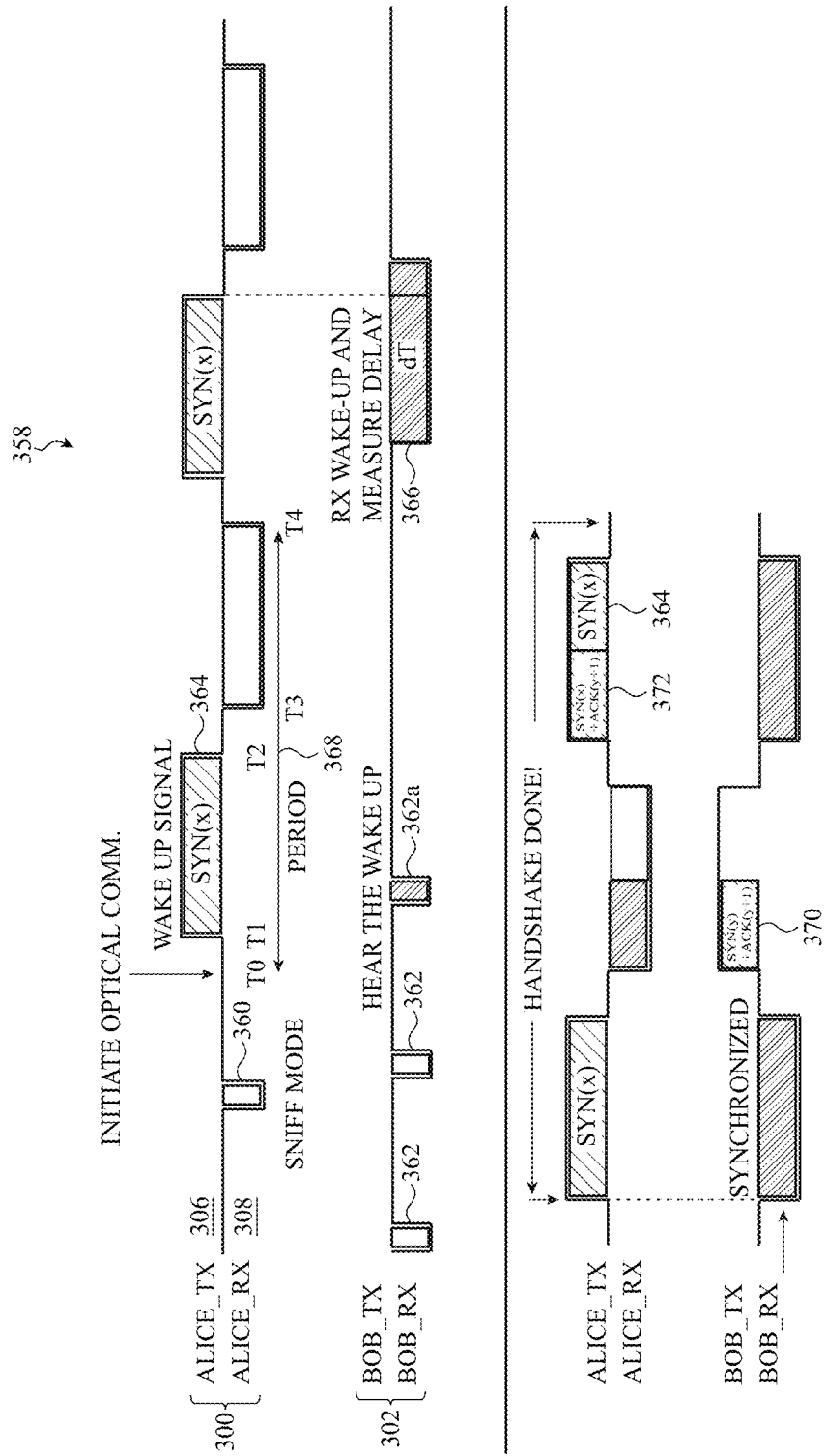
FIG. 3F shows an example of an optical communication handshake protocol usable for optical communication between electronic devices, such as between the electronic devices described with reference to FIG. 3A.

FIG. 3F shows an example of an optical communication handshake protocol 358 usable for optical communication between electronic devices, such as the electronic devices 300 and 302 described with reference to FIG. 3A. The electronic device 300 may include the optical transmitter 306 (labeled Alice_TX) and the optical receiver 308 (labeled Alice_RX). The electronic device 302 may include an optical transmitter labeled Bob_TX, and an optical receiver labeled Bob_RX. The optical communication handshake protocol 358 assumes mutual pointing of the electronic devices 300, 302 (i.e., the optical communication handshake protocol 358 assumes that an optical communication system of the electronic device 300 is pointed at an optical communication system of the electronic device 302, and vice versa).

Prior to time T0, each of the electronic devices 300, 302 may optically monitor for a synchronization signal transmitted by another device (e.g., each of the electronic devices 300, 302 may be in a sniff mode). The monitoring may be performed by Alice_RX and Bob_RX at a low duty cycle, at periodic monitoring instances 360 (for the electronic device 300) or 362 (for the electronic device 302). Alternatively, the monitoring may be performed at a high duty cycle but low frequency. At time T0, the electronic device 300 may determine to search for another electronic device, which other electronic device may be the electronic device 302 in particular, or another electronic device in general.

At T1, the electronic device 300 may use Alice_TX to optically transmit a wake up or synchronization signal 364 (SYN(x)), and at a next periodic monitoring instance 362a, the electronic device 302 may receive a portion of the synchronization signal 364 using Bob_RX. After receiving a portion of the synchronization signal 364, the electronic device 302 may switch Bob_RX to a higher duty cycle listening mode, and at a first instance 366 of the higher duty cycle listening mode, the electronic device 302 may measure a delay (dT) from a start of the instance 366 to an end of the synchronization signal 364. The electronic device 302 may use the measured delay (dT) to synchronize Bob_RX with Alice_TX. Given a predetermined, known pattern of transmit/receive cycles, the electronic device 302 may also use the measured delay (dT) to synchronize Bob_TX with Alice_RX. As shown, the predetermined, known pattern of transmit/receive cycles may be defined by a period 368 having a transmit/receive portion between times T1 and T2, and a receive/transmit portion between times T3 and T4. A short interframe space (SIFS) may be provided between T2 and T3, and between T4 of one period 368 and T1 of a next period 368.

After synchronizing with the electronic device 300, the electronic device 302 may use Bob_TX to transmit a synchronization acknowledgment signal 370 (SYN(y)+ACK(x+1)) to Alice_RX. The synchronization acknowledgement signal 370 may span the entirety of a receive/transmit portion, or may be limited to a portion of the receive/transmit portion (e.g., half or a quarter of the receive/transmit portion) to provide temporal bandwidth usable by other devices. After receiving the synchronization acknowledgement signal 370, the electronic device 300 may use Alice_TX to transmit a synchronization acknowledgement signal 372 (SYN(x)+ACK(y+1)). The synchronization acknowledgement signal 372 may span the entirety of a transmit/receive portion, or may be limited to a portion of the transmit/receive portion (e.g., half or a quarter of the transmit/receive portion) to enable continued transmission of the synchronization signal 364, or to provide temporal bandwidth usable by other devices.

Following the transmission of synchronization acknowledgement signals 370, 372, the optical communication handshake protocol 358 is complete, and the electronic devices 300, 302 may engage in further optical communications.

Figure 4:
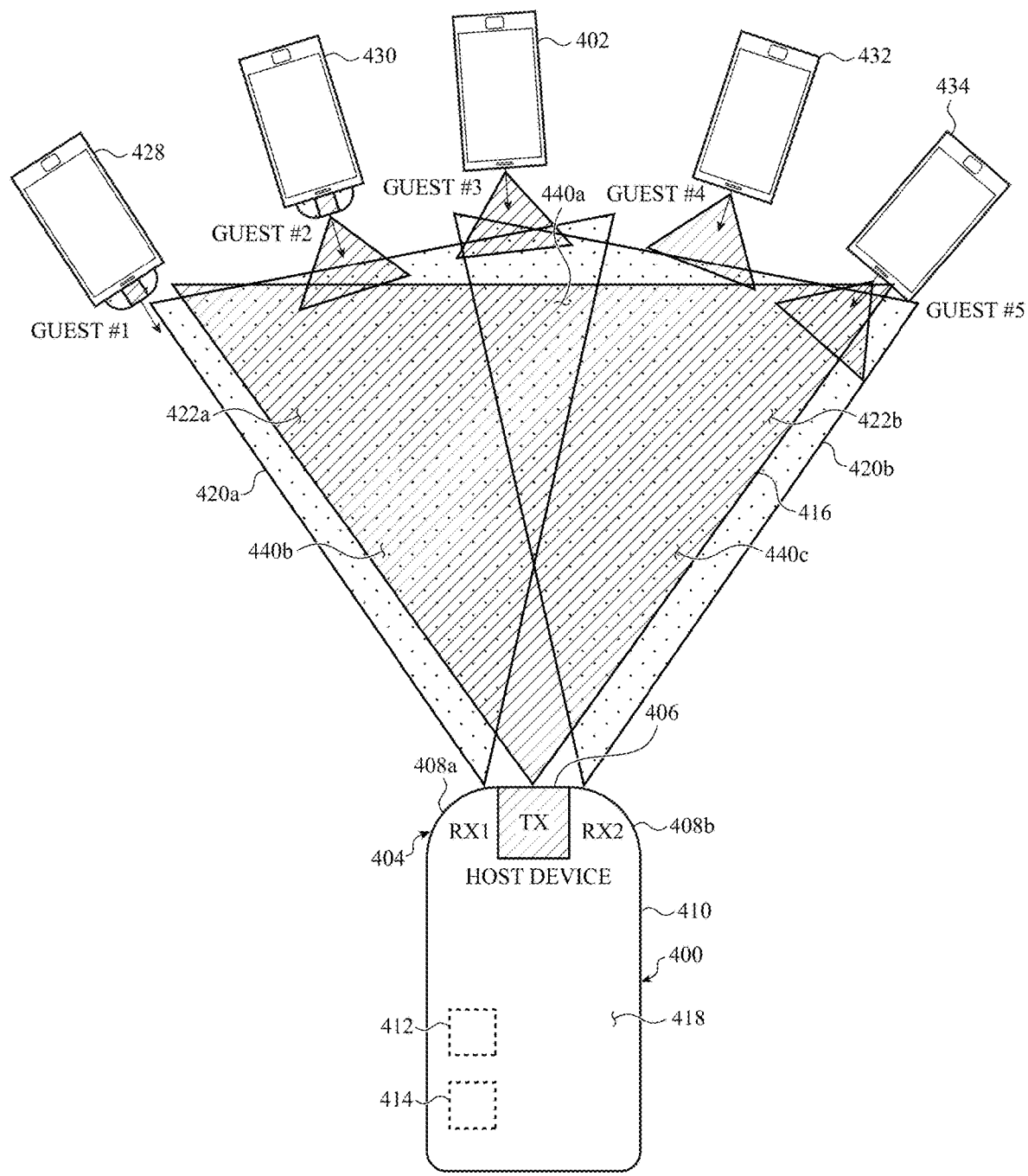
FIG. 4 shows an example of an electronic device communicating with another electronic device using a dual receive channel line-of-sight optical communication system.

FIG. 4 shows an example of an electronic device 400 (e.g., a mobile electronic device) communicating with another electronic device 402 (e.g., a mobile electronic device or a stationary electronic device) using a dual receive channel line-of-sight optical communication system 404. By way of example, the electronic device 400 is shown to be a smart phone, but the electronic device 400 could alternately be a tablet computer, wearable device (e.g., a watch), or other type of electronic device (or a system having an electronic subsystem).

The optical communication system 404 may include an optical transmitter 406, a first optical receiver 408a, and a second optical receiver 408b. The first optical receiver 408a may be positioned on a first side of the optical transmitter 406, and the second optical receiver 408b may be positioned on a second side of the optical transmitter 406, with the first and second sides of the optical transmitter 406 being opposite sides of the optical transmitter 406. The optical communication system 404 may emit electromagnetic radiation (e.g., visible or invisible light (e.g., IR light)) using the optical transmitter 406, and may receive electromagnetic radiation using the first optical receiver 408a and/or the second optical receiver 408b. The first and second optical receivers 408a, 408b enable a dual receive channel capability of the electronic device 400. In some embodiments, the optical transmitter 406, first optical receiver 408a, and second optical receiver 408b may be disposed in or on an enclosure 410 of the electronic device 400 (e.g., near an edge of the electronic device 400). The electronic device 400 may also include a motion sensor 412 and a processor 414.

The optical transmitter 406 may have an acute angular transmission space 416 (or FoR). The acute angular transmission space 416 may span an acute angle with respect to a coordinate plane that passes through or near a top edge of the electronic device 400 and is perpendicular to the front surface 418 of the electronic device 400. The coordinate plane may be chosen such that the acute angular transmission space 416 has a horizontal angular extent (or substantially horizontal angular extent) when the electronic device 400 is placed on a horizontal surface or held in a user's hand. In some embodiments, the acute angular transmission space 416 may have an angular extent of less than 45 degrees, or less than 30 degrees, or between 10 and 15 degrees. A narrower angular transmission space may enable the electronic device 400 to more precisely determine a direction or location of another electronic device, and may improve the security of optical communications. A wider angular transmission space may enable the electronic device 400 to more easily discover another electronic device.

The first optical receiver 408a may have a first acute angular reception space 420a. The first acute angular reception space 420a may overlap a first portion 422a of the acute angular transmission space 416, and may also have a portion that does not overlap the acute angular transmission space 416. The second optical receiver 408b may have a second acute angular reception space 420b, and may also have a portion that does not overlap the acute angular transmission space 416. The second acute angular reception space 420b may overlap a second portion 422b of the acute angular transmission space 416. The second portion 422b is different from the first portion 422a, and partially overlaps the first portion 422a within the acute angular transmission space 416.

The overlap between the first acute angular reception space 420a, the second acute angular reception space 420b, and the acute angular transmission space 416 may define a central communication space 440a for the electronic device 400. The overlap between just the first acute angular reception space 420a and the acute angular transmission space 416 may define a left communication space 440b. The overlap between just the second acute angular reception space 420b and the acute angular transmission space 416 may define a right communication space 440c. The electronic device 400 may communicate with the electronic device 402 when the electronic device 402 is in the central communication space 440a, the left communication space 440b, or the right communication space 440c, but communication may be improved (e.g., received optical signal strength may be improved) and/or more secure when the electronic device 402 is within the central communication space 440a of the electronic device 400.

In some embodiments, the motion sensor 412 may include an accelerometer, gyroscope, or magnetometer. The motion sensor 412 may also include a processor in some embodiments. The processor 414 may control some or all of the operations of the electronic device 400, and may communicate directly or indirectly with some or all of the other components of the electronic device 400. The processor 414 may be a singular processor, or may include different components for performing the same or different functions.

The processor 414 may be configured to determine when another electronic device is within the acute angular transmission space 416, the first acute angular reception space 420a, and the second acute angular reception space 420b (e.g., within the central communication space). In some embodiments, the processor 414 may also be configured to determine when another electronic device is in the left communication space or the right communication space. The processor 414 may make these determinations using signals received from the first optical receiver 408a and the second optical receiver 408b. For example, the processor 414 may make the determinations in response to receiving optical communications from the other electronic device at the first optical receiver 408a, the second optical receiver 408b, or both optical receivers 408a, 408b.

The processor 414 may also be configured to perform an optical communication handshake with another electronic device (i.e., a second electronic device). In some embodiments, the optical communication handshake may only be performed when the other electronic device is within the acute angular transmission space 416, the first acute angular reception space 420a, and the second acute angular reception space 420b (i.e., within the central communication space). In other embodiments, the processor 414 may alternatively or additionally perform an optical communication handshake with another electronic device that is within the left communication space, the central communication space, or the right communication space.

In some embodiments, the electronic device 400 may optically communicate with the electronic device 402. The electronic device 402 may have an optical communication system configured the same or similarly to the optical communication system 404 of the electronic device 400. The optical communication handshake may enable the electronic device 400 to optically communicate with the electronic device 402. In some examples, the electronic devices 400, 402 may enable their users to communicate while seated around a conference table or mingling in a room. In other examples, the electronic devices 400, 402 may be navigation systems of nearby motor vehicles. In still other examples, the electronic device 400 may be a smart phone or remote controller, and the electronic device 402 may be a stationary appliance or controller that the electronic device 400 may communicate with to control one or more of an appliance, lighting, heating, an alarm system, and so on.

The processor 414 may also be configured to record a posing of the electronic device 400 when the electronic device 400 is determined to be pointing at the second electronic device 402 (e.g., when the second electronic device 402 is determined to be in the central communication space 440a) while performing the optical communication handshake, and to compare a current posing of the electronic device 400 to the recorded posing of the electronic device 400 to determine when the electronic device 400 is posed to communicate with the electronic device 402. The posing may be determined using one or more signals provided by the motion sensor 412, and may include, for example, a heading angle of the electronic device 400 or a directional location of the electronic device 402. In some embodiments, the electronic device 400 may store the recorded posing indefinitely, or until the electronic device 400 determines a new posing that enables the electronic device 400 to optically communicate with the electronic device 402. In some embodiments, the electronic device 400 may discard or clear the recorded posing after the electronic device 400 has been maintained in the recorded posing for a period of time but has been unable to re-establish optical communication with the electronic device 402.

In some embodiments, the processor 414 may also record posings of the electronic device 400 when the second electronic device 402 is determined to be in the left communication space 440b or the right communication space 440c. These posings may be used to guide a user in pointing the electronic device 400 toward the second electronic device 402.

In some embodiments, the processor 414 may be configured to provide a posing cue to a user of the electronic device 400. The posing cue may guide a user of the electronic device 400 on how to return the electronic device 400 to the recorded posing to optically communicate with the second electronic device 402.

In some embodiments, the posing cue may take the form of a relative position of an icon on a display of the electronic device 400 (e.g., as described with reference to FIG. 3A). The icon may identify the second electronic device 402 or its user (Guest #3), and may change position on the display as a user moves the electronic device 400 with respect to the second electronic device 402. In some embodiments, a reference for interpreting the second electronic device's direction or location with respect to the electronic device 400 may be displayed on the display. For example, the walls of a room in which the electronic devices 400, 402 are located may be displayed on the display of the electronic device 400. Additionally or alternatively, the processor 414 may cause a haptic output system of the electronic device 400 to deliver haptic posing cues to a user. The haptic posing cues may indicate when a user has pointed the optical communication system 404 of the electronic device 400 toward the second electronic device 402, and in some cases may include different posing cues based on whether the electronic device 400 is pointed in a direction that is closer to or farther from the direction of the second electronic device 402. The processor 414 may also cause a speaker of the electronic device 400 to provide a posing cue in the form of an audio notification.

Optical communication between the electronic devices 400, 402 depends on mutual pointing. That is, each electronic device 400, 402 needs to be pointed toward the other electronic device. If the electronic device 400 is moved to point toward the electronic device 428, 430, 432, or 434 of Guest #1, #2, #4, or #5, and the electronic device 428, 430, 432, or 434 is pointed at the electronic device 400 (i.e., the host device), then the electronic device 400 may perform an optical communication handshake with one of these other electronic devices 428, 430, 432, or 434 and communicate with one of these other electronic devices 428, 430, 432, or 434. When a posing of each discovered electronic device is recorded by the electronic device 400, the user of the electronic device 400 may receive and respond to cues (e.g., visual, haptic, and/or audio cues) provided by the electronic device 400 to return to a posing that enables the electronic device 400 to communicate with a particular other electronic device.

In alternative embodiments of the electronic device 400, the first and second optical receivers 408a, 408b may both be disposed on the same side of the optical transmitter 406, or disposed in other ways that still provide the overlapping transmission/reception spaces 416, 420a, 420b described with reference to FIG. 4.

FIG. 5 shows an example series of optical communication handshakes 500 that may be performed between a pair of electronic devices 500, 502. In some cases, the electronic devices 500, 502 may be examples of the electronic devices 400, 402 described with reference to FIG. 4. Each of the electronic devices 500, 502 may include a dual receive channel line-of-sight optical communication system having an optical transmitter and pair of optical receivers, which may be configured as described with reference to FIG. 4.

During a first optical communication handshake 504, a first electronic device 500 (the host) may optically transmit a wake up or synchronization signal (e.g., a wake up beacon) while a second electronic device 502 (the guest) optically monitors for synchronization signals (see, posing 506). The synchronization signal may be transmitted with (or may be) a Host ID (i.e., an identifier of the host, which may be a predetermined or random identifier).

After transmitting the synchronization signal, the host may transition to a listen mode (see, posing 508). If the guest receives the synchronization signal transmitted by the host, the guest may wake up (e.g., transition from a low duty cycle monitoring mode to a higher duty cycle communication mode) and optically transmit a guiding signal. The guiding signal may be transmitted with (or may be) a Guest ID (i.e., an identifier of the guest, which may be a predetermined or random identifier). While in the listening mode, the host may optically receive the synchronization acknowledgement signal transmitted by the guest.

Either or both of the electronic devices 500, 502 may be panned (e.g., rotated left or right) as the first optical communication handshake 504 is performed. In some cases, the host may optically transmit multiple instances of the synchronization signal and the guest may optically receive one or multiple instances of the synchronization signal. Similarly, the guest may optically transmit one or multiple instances of the guiding signal, and the host may optically receive one or multiple instances of the guiding signal. The host and guest may each record an optical power of each received signal (at one or both of its optical receivers), a posing of the host or guest, or other information. Each of the host and guest may use this recorded information to determine a posing that optimizes its optical communication with the other device.

During a second optical communication handshake 510, the guest may continue to optically transmit the guiding signal (and Guest ID) while the host optically monitors for the guiding signal (see, posing 512). After the host determines it is pointing at the guest and receiving optical communications from the guest at each of its optical receivers, the host may optically transmit a one-way lock confirmation signal to the guest (see, posing 514). In some embodiments, the one-way lock confirmation signal may be transmitted with (or may be) the Host ID in combination with the Guest ID. The one-way lock confirmation signal may alternatively be transmitted with additional or different information.

During a third optical communication handshake 516, the host may continue to optically transmit the one-way lock confirmation signal while the guest optically monitors for the one-way lock confirmation signal (see, posing 518). After the guest determines it is pointing at the host and receiving optical communications from the host at each of its optical receivers, the guest may optically transmit a mutual lock confirmation signal to the host (see, posing 520). In some embodiments, the mutual lock confirmation signal may be transmitted with (or may be) the Host ID in combination with the Guest ID. The mutual lock confirmation signal may alternatively be transmitted with additional or different information.

Figure 6A:
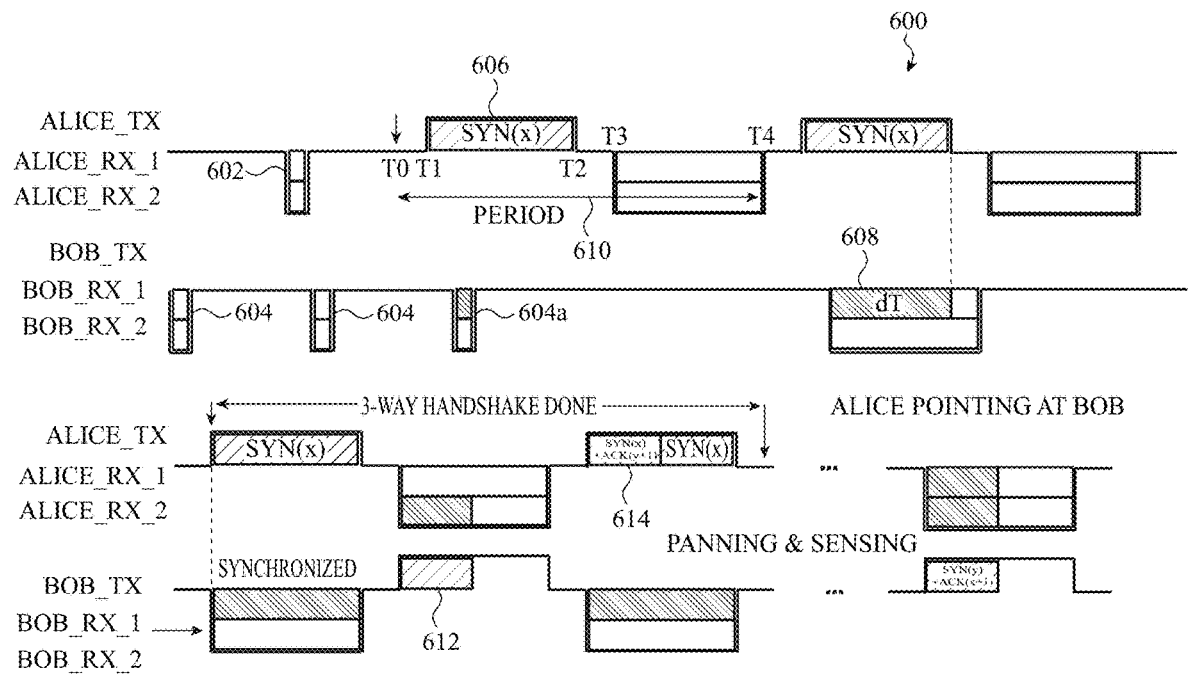
FIGS. 6A-6D show examples of optical communication handshake protocols usable for optical communication between electronic devices, such as between the electronic devices described with reference to FIG. 4 or 5.

FIG. 6A shows an example of an optical communication handshake protocol 600 usable for optical communication between electronic devices, such as between the electronic devices 400 and 402 described with reference to FIG. 4, or between the electronic devices 500 and 502 described with reference to FIG. 5. A first electronic device may include an optical transmitter (labeled Alice_TX) and a pair of optical receivers (labeled Alice_RX_1 and Alice_RX_2). A second electronic device may include an optical transmitter (labeled Bob_TX), and a pair of optical receivers (labeled Bob_RX_1 and Bob_RX_2).

Prior to time T0, each of the electronic devices may optically monitor for a synchronization signal transmitted by another device (e.g., each of the electronic devices may be in a sniff mode). The monitoring may be performed by Alice_RX_1, Alice_RX_2, Bob_RX_1, and Bob_RX_2 at a low duty cycle, at periodic monitoring instances 602 (for Alice's device (hereafter referred to as Alice)) or 604 (for Bob's device (hereafter referred to as Bob)). At time T0, Alice may determine to search for another electronic device, which other electronic device may be Bob in particular, or another electronic device in general.

At T1, Alice may use Alice_TX to optically transmit a wake up or synchronization signal 606 (SYN(x)), and at a next periodic monitoring instance 604a, Bob may receive a portion of the synchronization signal 606 using Bob_RX_1 (or alternatively, by Bob_RX_1 and/or Bob_RX_2). After receiving a portion of the synchronization signal 606, Bob may switch Bob_RX_1 and Bob_RX_2 to a higher duty cycle listening mode, and at a first instance 608 of the higher duty cycle listening mode, Bob may measure a delay (dT) from a start of the instance 608 to an end of the synchronization signal 606 (e.g., using Bob_RX_1). Bob may use the measured delay (dT) to synchronize both Bob_RX_1 and Bob_RX_2 with Alice_TX. Given a predetermined, known pattern of transmit/receive cycles, Bob may also use the measured delay (dT) to synchronize Bob_TX with Alice_RX_1 and Alice_RX_2. As shown, the predetermined, known pattern of transmit/receive cycles may be defined by a period 610 having a transmit/receive portion between times T1 and T2, and a receive/transmit portion between times T3 and T4. A SIFS may be provided between T2 and T3, and between T4 of one period 610 and T1 of a next period 610.

After synchronizing with Alice, Bob may use Bob_TX to transmit a synchronization acknowledgment signal 612 (SYN(y)+ACK(x+1)) to Alice. The synchronization acknowledgement signal 612 may be received by Alice_RX_2 (or alternatively, by Alice_RX_1 and/or Alice_RX_2). The synchronization acknowledgement signal 612 may by a guiding signal as referenced in FIG. 5. The synchronization acknowledgement signal 612 may span the entirety of a receive/transmit portion, or may be limited to a portion of the receive/transmit portion (e.g., half or a quarter of the receive/transmit portion) to provide temporal bandwidth usable by other devices. After receiving the synchronization acknowledgement signal 612 (e.g., at Alice_RX_2), Alice may use Alice_TX to transmit a synchronization acknowledgement signal 614 (SYN(x)+ACK(y+1)) to Bob. The synchronization acknowledgement signal 614 may span the entirety of a transmit/receive portion, or may be limited to a portion of the transmit/receive portion (e.g., half or a quarter of the transmit/receive portion) to enable continued transmission of the synchronization signal 606, or to provide temporal bandwidth usable by other devices. The synchronization acknowledgement signal 614 may be received by Bob_RX_1 (or alternatively, by Bob_RX_1 and/or Bob_RX_2).

Following the transmission of synchronization acknowledgement signals 612, 614, the optical communication handshake protocol 600 is complete, Alice and Bob are synchronized, and Alice and Bob may engage in further optical communications, such as further optical handshakes performed while or after panning and sensing to ensure that Alice is pointing at Bob and vice versa, further authentication protocols, security protocols, data exchange, and so on.

Figure 6B:
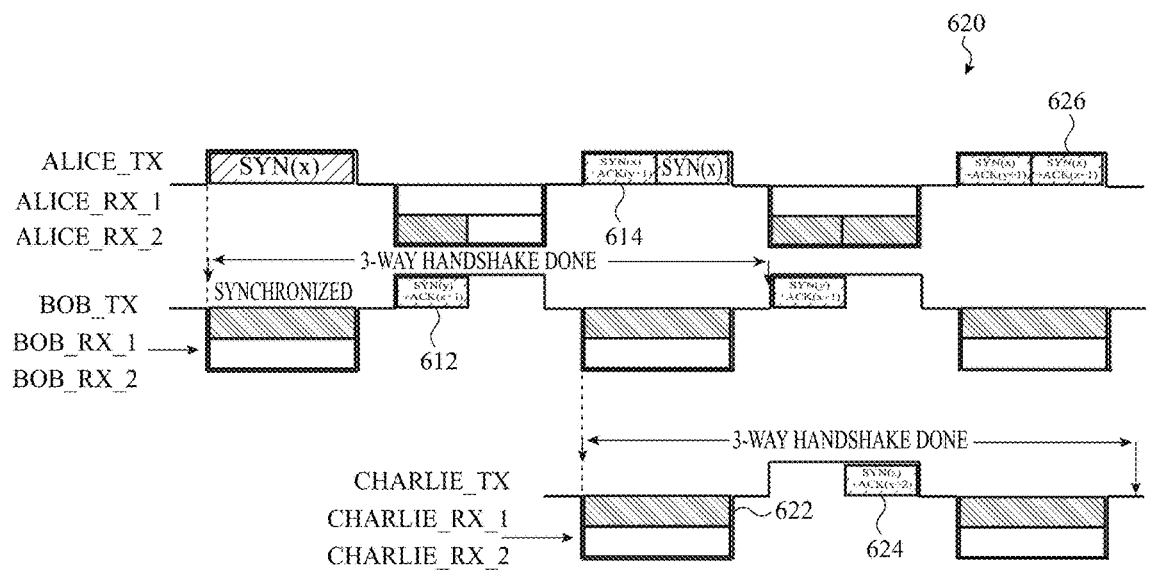

FIG. 6B shows an example of an optical communication handshake protocol 620 usable for optical communication between electronic devices, such as between the electronic devices 400 and 402 described with reference to FIG. 4, the electronic devices 500 and 502 described with reference to FIG. 5, or the Alice and Bob devices described with reference to FIG. 6A. By way of example, FIG. 6B is described with reference to the Alice and Bob devices described with reference to FIG. 6A.

FIG. 6B shows the tail end of the optical communication handshake protocol 600, with Bob using Bob_TX to transmit the synchronization acknowledgment signal 612 (SYN (y)+ACK(x+1)) to Alice, and Alice using Alice_TX to transmit the synchronization acknowledgement signal 614 (SYN(x)+ACK(y+1)) to Bob.

After the optical communication handshake is performed between Alice and Bob, Charlie's device (hereafter Charlie) may also perform the optical communication handshake protocol 600 with Alice. After performing a dT measurement similarly to Bob, Charlie may synchronize with Alice, and indirectly with Bob, by transmit/receive portion 622. After synchronizing with Alice, Charlie may use Charlie_TX to transmit a synchronization acknowledgment signal 624 (SYN(z)+ACK(x+2)) to Alice. The synchronization acknowledgement signal 624 may by a guiding signal as referenced in FIG. 5. The synchronization acknowledgement signal 624 may be limited to a portion of the receive/transmit portion (e.g., half or a quarter of the receive/transmit portion, because Charlie can detect that the first half of the receive/transmit portion is occupied by another party that transmitted ACK(y+1) in the first half of the receive/transmit portion). After receiving the synchronization acknowledgement signal 624 (e.g., at Alice_RX_2), Alice may use Alice_TX to transmit a synchronization acknowledgement signal 626 (SYN(x)+ACK(z+1)) to Charlie. The synchronization acknowledgement signal 626 may be limited to a portion of the transmit/receive portion (e.g., half or a quarter of the transmit/receive portion) to provide temporal bandwidth usable by other devices (e.g., by Bob). The synchronization acknowledgement signal 626 may be received by Charlie_RX_1.

Following the transmission of synchronization acknowledgement signals 624, 626, the optical communication handshake protocol 620 is complete, Alice and Charlie are synchronized and may engage in further optical communications, such as further optical handshakes performed while or after panning and sensing to ensure that Alice is pointing at Charlie and vice versa.

Figure 6C:
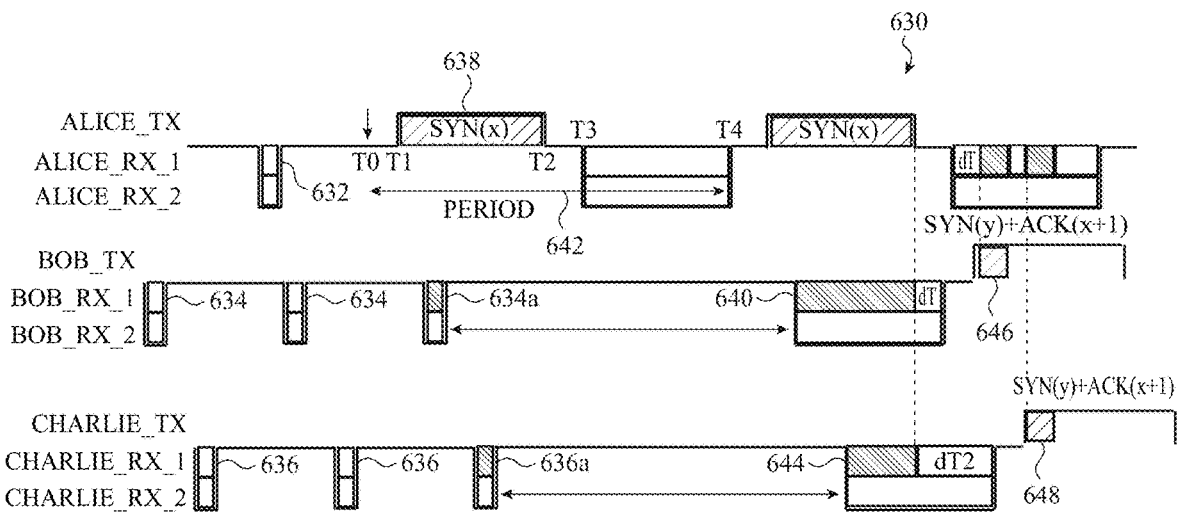

FIG. 6C shows an example of an optical communication handshake protocol 630 usable for optical communication between electronic devices, such as between the electronic devices 400 and 402 described with reference to FIG. 4, the electronic devices 500 and 502 described with reference to FIG. 5, or the Alice, Bob, and Charlie devices described with reference to FIGS. 6A & 6B. By way of example, FIG. 6C is described with reference to the Alice, Bob, and Charlie devices described with reference to FIGS. 6A & 6B, but differs from the scenario described with reference to FIG. 6B (in which Charlie performs a handshake with Alice after Bob performs a handshake with Alice) in that FIG. 6C shows a scenario in which Bob and Charlie attempt to perform handshakes with Alice in parallel (e.g., at the same time).

Prior to time T0, each of Alice, Bob, and Charlie may optically monitor for a synchronization signal transmitted by another device (e.g., each of Alice, Bob, and Charlie may be in a sniff mode). The monitoring may be performed by Alice_RX_1, Alice_RX_2, Bob_RX_1, Bob_RX_2, Charlie_RX_1, and Charlie_RX_2 at a low duty cycle, at periodic monitoring instances 632 (for Alice), 634 (for Bob), or 636 (for Charlie). At time T0, Alice may determine to search for another electronic device, which other electronic device may be Bob or Charlie in particular, or another electronic device in general.

At T1, Alice may use Alice_TX to optically transmit a wake up or synchronization signal 638 (SYN(x)). At a next periodic monitoring instance 634a, Bob may receive a portion of the synchronization signal 638 using Bob_RX_1. At a next periodic monitoring instance 636a, Charlie may receive a portion of the synchronization signal 638 using Charlie_RX_1. After receiving a portion of the synchronization signal 638, Bob may switch Bob_RX_1 and Bob_RX_2 to a higher duty cycle listening mode, and Charlie may switch Charlie_RX_1 and Charlie_RX_2 to a higher duty cycle listening mode.

At a first instance 640 of the higher duty cycle listening mode, Bob may measure a delay (dT) from a start of the instance 640 to an end of the synchronization signal 638 (e.g., using Bob_RX_1). Bob may use the measured delay (dT) to synchronize both Bob_RX_1 and Bob_RX_2 with Alice_TX. Given a predetermined, known pattern of transmit/receive cycles, Bob may also use the measured delay (dT) to synchronize Bob_TX with Alice_RX_1 and Alice_RX_2. As shown, the predetermined, known pattern of transmit/receive cycles may be defined by a period 642 having a transmit/receive portion between times T1 and T2, and a receive/transmit portion between times T3 and T4. A SIFS may be provided between T2 and T3, and between T4 of one period 642 and T1 of a next period 642.

Similarly, at a first instance 644 of the higher duty cycle listening mode, Charlie may measure a delay (dT2) from a start of the instance 644 to an end of the synchronization signal 638 (e.g., using Charlie_RX_1). Charlie may use the measured delay (dT2) to synchronize both Charlie_RX_1 and Charlie_RX_2 with Alice_TX. Charlie may also use the measured delay (dT2) to synchronize Charlie Tex. with Alice_RX_1 and Alice_RX_2.

After synchronizing with Alice, Bob may use Bob_TX to transmit a synchronization acknowledgment signal 646 (SYN(y)+ACK(x+1)) to Alice. The synchronization acknowledgement signal 646 may by a guiding signal as referenced in FIG. 5. The synchronization acknowledgement signal 646 may be transmitted within a lower duty cycle window having a random timing, a timing assigned to Bob, or a timing based on the timing of the periodic monitoring instances 634.

After synchronizing with Alice, Charlie may use Charlie_TX to transmit a synchronization acknowledgment signal 648 (SYN(z)+ACK(x+1)) to Alice. The synchronization acknowledgement signal 648 may by a guiding signal as referenced in FIG. 5. The synchronization acknowledgement signal 648 may be transmitted within a lower duty cycle window having a random timing, a timing assigned to Charlie, or a timing based on the timing of the periodic monitoring instances 636.

The durations and timings of the synchronization acknowledgement signals 646, 648 may reduce the likelihood of a collision between Bob's and Charlie's signals 646, 648. If Alice receives the synchronization acknowledgement signals 646, 648 at different times, Alice may differentiate Bob's and Charlie's communications based on their times of arrival, and thereafter transmit to Bob and Charlie within different windows that indicate when Bob and Charlie may transmit to Alice. Should the synchronization acknowledgement signals 646, 648 collide, Bob and Charlie may randomly retransmit the synchronization acknowledgement signals 646, 648 at different times.

Figure 6D:
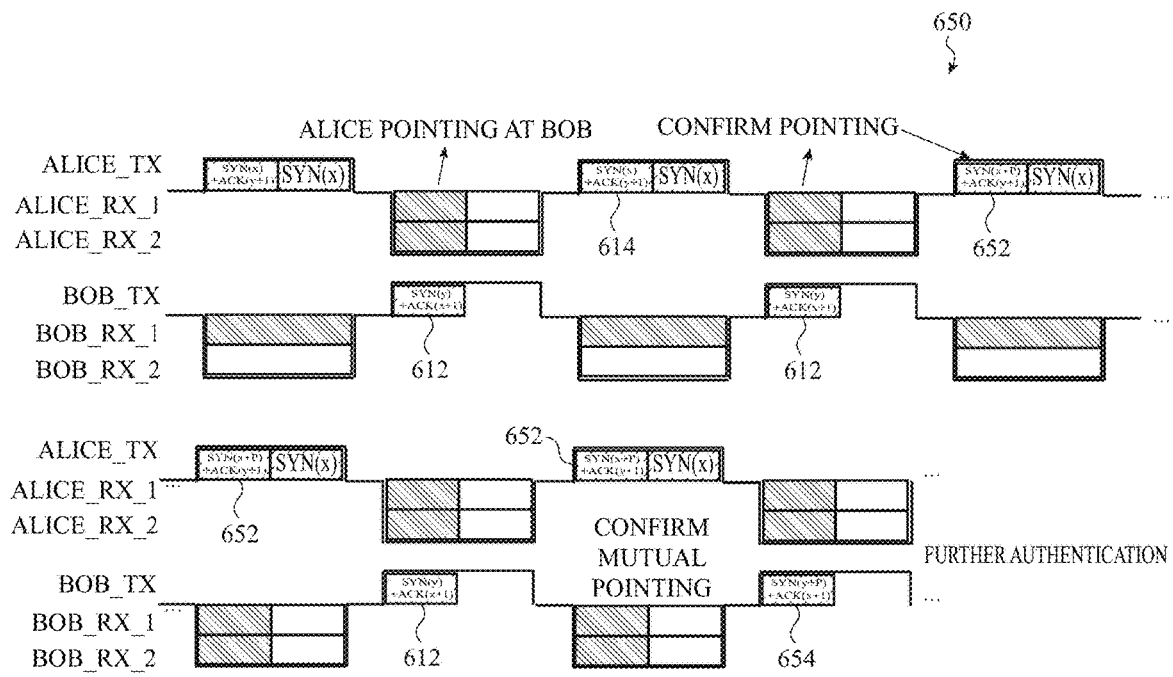

FIG. 6D shows an example of an optical communication handshake protocol 650 usable for optical communication between electronic devices, such as between the electronic devices 400 and 402 described with reference to FIG. 4, the electronic devices 500 and 502 described with reference to FIG. 5, or the Alice and Bob devices described with reference to FIGS. 6A & 6B. By way of example, FIG. 6D is described with reference to the Alice and Bob devices described with reference to FIGS. 6A & 6B.

FIG. 6D shows the tail end of the optical communication handshake protocol 600, with Alice using Alice_TX to transmit the synchronization acknowledgement signal 614 (SYN(x)+ACK(y+1)) to Bob. After performing the optical communication handshake protocol 600, Alice may obtain a one-way lock on Bob by pointing at Bob. In some cases, Alice may already be pointing at Bob. In other cases, Alice may need to pan to point at Bob. While Alice is determining whether a one-way lock on Bob has been achieved, Alice and Bob may continue to transmit synchronization acknowledgement signals 612, 614 (or guiding signals). Sooner or later, Alice may receive Bob's synchronization acknowledgement signal 612 at both of its optical receivers (i.e., Alice_RX_1 and Alice_RX_2), and may determine whether an optical power of the received signal 612 is the same (or sufficiently balanced) at its optical receivers. After such a determination is made, Alice may record its posing and use Alice_TX to optically transmit a one-way lock confirmation signal 652 (SYN(x+P)+ACK(y+1)) to Bob. In some embodiments, the one-way lock confirmation signal 652 may be transmitted with (or may be) an identifier of Alice (e.g., a Host ID) in combination with an identifier of Bob (e.g., a Guest ID). The one-way lock confirmation signal may alternatively be transmitted with additional or different information. The one-way lock confirmation signal 652 may span the entirety of a transmit/receive portion, or may be limited to a portion of the transmit/receive portion (e.g., half or a quarter of the transmit/receive portion) to enable continued transmission of a synchronization signal 606, or to provide temporal bandwidth usable by other devices. The one-way lock confirmation signal 652 may be received by Bob_RX_1 (or alternatively, by Bob_RX_1 and/or Bob_RX_2). The optical communication handshake described in this paragraph is an example of the second optical communication handshake 510 described with reference to FIG. 5.

After (or while) Alice confirms a one-way lock with Bob, Bob may obtain a lock on Alice by pointing at Alice. In some cases, Bob may already be pointing at Alice. In other cases, Bob may need to pan to point at Alice. While Bob is determining whether a lock on Alice has been achieved, Alice and Bob may continue to transmit synchronization acknowledgement signals 612, 614 (or guiding signals). Or, if Alice has already confirmed a one-way lock on Bob, Alice may continue to transmit one-way lock confirmation signals 652 while Bob continues to transmit synchronization acknowledgement signals 612. Sooner or later, Bob may receive Alice's one-way lock confirmation signal 652 (or synchronization acknowledgement signal 614) at both of its optical receivers (i.e., Bob_RX_1 and Bob_RX_2), and may determine whether an optical power of the received signal 652 or 612 is the same (or sufficiently balanced) at its optical receivers. After such a determination is made, Bob may record its posing and use Bob_Tex. to optically transmit a mutual lock confirmation signal 654 (SYN(y+P)+ACK(x+1)) to Alice. Alternatively, Bob may transmit a one-way lock confirmation signal if Alice has not yet completed a lock on Bob. In some embodiments, the mutual lock confirmation signal 654 may be transmitted with (or may be) an identifier of Alice (e.g., a Host ID) in combination with an identifier of Bob (e.g., a Guest ID). The mutual lock confirmation signal may alternatively be transmitted with additional or different information. The mutual lock confirmation signal 654 may span the entirety of a receive/transmit portion, or may be limited to a portion of the receive/transmit portion (e.g., half or a quarter of the mutual lock confirmation signal 654 may be received by Alice_RX_1 and/or Alice_RX_2, and by both Alice_RX_1 and Alice_RX_2 if Alice is locked on Bob. The optical communication handshake described in this paragraph is an example of the third optical communication handshake 516 described with reference to FIG. 5.

Following the transmission of one-way and mutual lock confirmation signals 652, 654, Alice and Bob are synchronized, and Alice and Bob may engage in further optical communications, such as further authentication protocols, security protocols, data exchange, and so on.

Figure 7A:
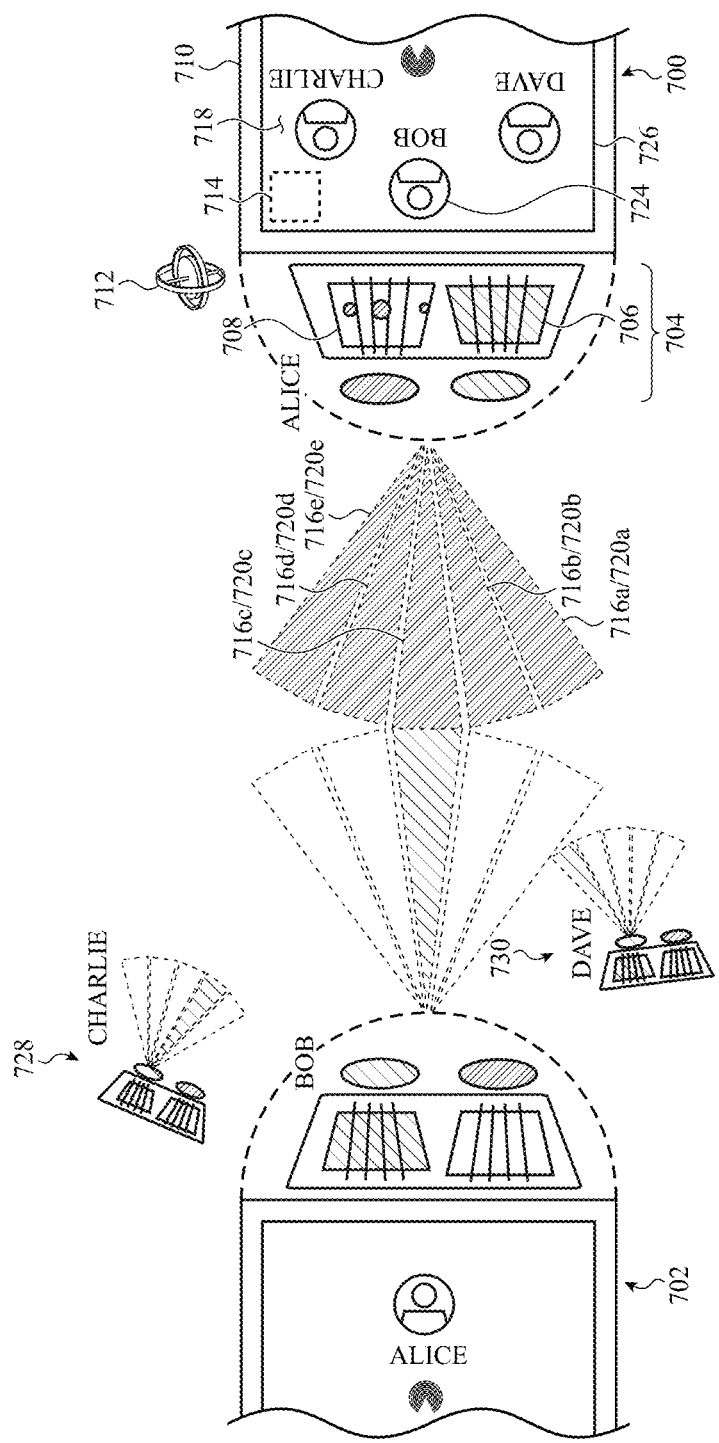
FIG. 7A shows an example of an electronic device communicating with other electronic devices using a multiple channel line-of-sight optical communication system.

FIG. 7A shows an example of an electronic device 700 (e.g., Alice's device, which may be a mobile electronic device) communicating with other electronic devices, which may be mobile electronic devices or stationary electronic devices, using a multiple channel line-of-sight optical communication system 704. By way of example, the electronic device 700 is shown to be a smart phone, but the electronic device 700 could alternately be a tablet computer, wearable device (e.g., a watch), or other type of electronic device (or a system having an electronic subsystem). For ease of explanation, optical communication systems are shown apart from their respective electronic devices in FIG. 7A (e.g., optical communication system 704 is shown apart from the electronic device 700). In actual devices, the optical communication systems would be incorporated into or onto their respective electronic devices.

The optical communication system 704 may include an optical transmitter 706 and an optical receiver 708. The optical communication system 704 may emit electromagnetic radiation (e.g., visible or invisible light (e.g., IR light)) using the optical transmitter 706, and may receive electromagnetic radiation using the optical receiver 708. In some embodiments, the optical transmitter 706 and optical receiver 708 may be disposed in or on an enclosure 710 of the electronic device 700 (e.g., near an edge of the electronic device 700). The electronic device 700 may also include a motion sensor 712 and a processor 714. For ease of explanation, motion sensors are also shown apart from their respective electronic devices in FIG. 7A (e.g., motion sensor 712 is shown apart from the electronic device 700).

The optical transmitter 706 may have a set of multiple different (e.g., non-overlapping or partially overlapping) acute angular transmission spaces 716 (or FoRs), such as spaces 716a, 716b, 716c, 716d, and 716e. In alternative embodiments, the optical transmitter 706 could have more or fewer than five acute angular transmission spaces 716. Each of the acute angular transmission spaces 716 may span an acute angle with respect to a coordinate plane that passes through or near a top edge of the electronic device 700 and is perpendicular to the front surface 718 of the electronic device 700. The coordinate plane may be chosen such that each of the acute angular transmission spaces 716 has a horizontal angular extent (or substantially horizontal angular extent) when the electronic device 700 is placed on a horizontal surface or held in a user's hand. In some embodiments, each of the acute angular transmission spaces 716 may have an angular extent of less than 45 degrees, or less than 30 degrees, or between 10 and 15 degrees. Narrower angular transmission spaces may enable the electronic device 700 to more precisely determine a direction or location of another electronic device, and may improve the security of optical communications.

The optical receiver 708 may have a set of multiple different (e.g., non-overlapping or partially overlapping) acute angular reception spaces 720. Each acute angular reception space 720 (e.g., space 720a, 720b, 720c, 720d, and 720e) may overlap a corresponding acute angular transmission space 716, and in some cases may be coincident (as shown), or substantially coincident, with a corresponding acute angular transmission space 716. In alternative embodiments, the optical receiver 708 could have more or fewer than five acute angular reception spaces 720. Each overlapping acute angular transmission space 716 and acute angular reception space 720 may be paired to form a separate acute angular communication space (or channel; e.g., acute angular communication spaces). In some embodiments, the electronic device 700 may transmit or receive to/from one or many other electronic devices (e.g., in a 1-1 or 1-many configuration). The transmissions and receptions of the electronic device may be made in a half-duplex manner, with the electronic device transmitting in one acute angular transmission space 716 at a time or receiving in one acute angular reception space 720 at a time (i.e., the device's transmissions and receptions may be multiplexed in time and space). This can reduce interference between different spaces. Alternatively, the electronic device may transmit in two or more (or all) acute angular transmission spaces simultaneously, receive in two or more (or all) acute angular reception spaces 720 simultaneously, and/or transmit and receive simultaneously. In some embodiments, the electronic device 700 may transmit in different acute angular transmission spaces 716 sequentially, and receive in different acute angular reception spaces 720 simultaneously.

In some embodiments, the motion sensor 712 may include an accelerometer, gyroscope, or magnetometer. The motion sensor 712 may also include a processor in some embodiments. The processor 714 may control some or all of the operations of the electronic device 700, and may communicate directly or indirectly with some or all of the other components of the electronic device 700. The processor 714 may be a singular processor, or may include different components for performing the same or different functions.

The processor 714 may be configured to perform an optical communication handshake with another electronic device (i.e., a second electronic device) when the other electronic device is within one of the acute angular communication spaces. In some embodiments, the other electronic device may be the electronic device 702. The electronic device 702 may have an optical communication system configured the same or similarly to the optical communication system 704 of the electronic device 700. The optical communication handshake may enable the electronic device 700 to optically communicate with the electronic device 702. In some examples, the electronic devices 700, 702 may enable their users to communicate while seated around a conference table or mingling in a room. In other examples, the electronic devices 7300, 702 may be navigation systems of nearby motor vehicles. In still other examples, the electronic device 700 may be a smart phone or remote controller, and the electronic device 702 may be a stationary appliance or controller that the electronic device

700 may communicate with to control one or more of an appliance, lighting, heating, an alarm system, and so on.

The processor 714 may also be configured to record a posing of the electronic device 700 while performing the optical communication handshake, and to compare a current posing of the electronic device 700 to the recorded posing of the electronic device 700 to determine when the electronic device 700 is posed to communicate with the electronic device 702. The posing may be determined using one or more signals provided by the motion sensor 712, and may include, for example, a heading angle of the electronic device 700 or a directional location of the electronic device 702. In some embodiments, the electronic device 700 may store the recorded posing indefinitely, or until the electronic device 700 determines a new posing that enables the electronic device 700 to optically communicate with the electronic device 702. In some embodiments, the electronic device 700 may discard or clear the recorded posing after the electronic device 700 has been maintained in the recorded posing for a period of time but has been unable to re-establish optical communication with the electronic device 702.

In some embodiments, the processor 714 may be configured to provide a posing cue to a user of the electronic device 700. The posing cue may guide a user of the electronic device 700 on how to return the electronic device 700 to the recorded posing to optically communicate with the second electronic device 702.

In some embodiments, the posing cue may take the form of a relative position of an icon 724 on a display 726 of the electronic device 700. The icon 724 may identify the second electronic device 702 or its user (e.g., Bob), and may change position on the display 726 as a user moves the electronic device 700 with respect to the second electronic device 702. In some embodiments, a reference for interpreting the second electronic device's direction or location with respect to the electronic device 700 may be displayed on the display 726. For example, the walls of a room in which the electronic devices 700, 702 are located may be displayed on the display 726 of the electronic device 700. Additionally or alternatively, the processor 714 may cause a haptic output system of the electronic device 700 to deliver haptic posing cues to a user. The haptic posing cues may indicate when a user has pointed the optical communication system 704 of the electronic device 700 toward the second electronic device 702, and in some cases may include different posing cues based on whether the electronic device 700 is pointed in a direction that is closer to or farther from the direction of the second electronic device 702. The processor 714 may also cause a speaker of the electronic device 700 to provide a posing cue in the form of an audio notification.

In some embodiments, the display 726 of the electronic device 700 may display a set of posing cues for different electronic devices with which the electronic device 700 is capable of communicating. In these embodiments, the set of posing cues may enable a user of the electronic device 700 to position the electronic device 700 such that the multiple channels of the electronic device 700 are best oriented to communicate with a set of other electronic devices. As shown in FIG. 7A, the electronic device 700 is positioned so that it may communicate with the second electronic device 702 (Bob) in a central communication space (e.g., a Space 0), and communicate with a third electronic device 728 (Charlie) in a right-most communication space (e.g., a Space +2), and communicate with a fourth electronic device 730 (Dave) in a left-most communication space (e.g., a Space −2).

In some embodiments, the processor 714 may be used to determine a coarse range to the electronic device 702. The coarse range may be determined, for example, based on an evaluation of strengths/powers of signals received from the electronic device 702 (and/or based on an evaluation of strengths/powers of signals measured by the electronic device 702 and reported to the electronic device 700).

Optical communication between the electronic devices 700, 702 depends on mutual pointing. That is, each electronic device 700, 702 needs to be pointed toward a communication space of the other electronic device. However, in contrast to the electronic devices 300, 400 described with reference to FIGS. 3 & 4, the multiple channel electronic devices 700, 702 may be pointed toward communication spaces of multiple other electronic devices simultaneously.

Figure 7B:
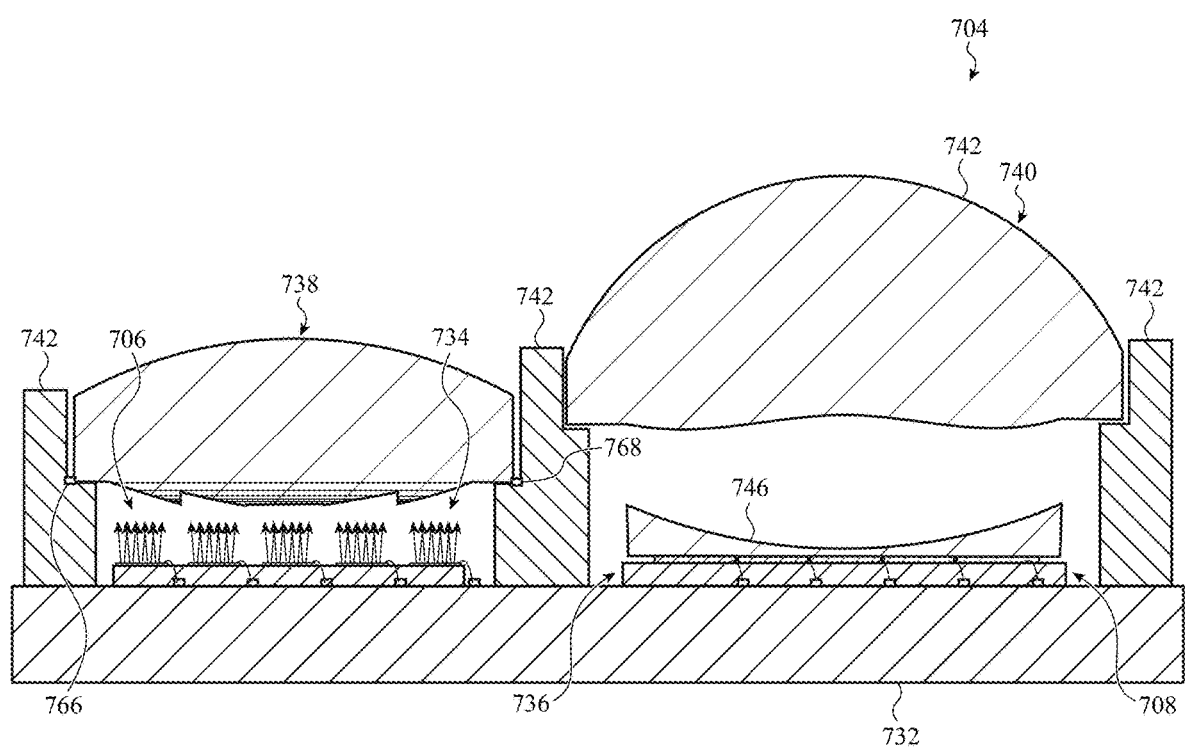
FIG. 7B shows an example implementation of components that may be included in the multiple channel line-of-sight optical communication system described with reference to FIG. 7A.

FIG. 7B shows an example implementation of components that may be included in the multiple channel line-of-sight optical communication system 704 described with reference to FIG. 7A. As shown, the optical transmitter 706 and optical receiver 708 may be mounted on a substrate 732 such as a PCB. By way of example, the optical transmitter 706 may emit electromagnetic radiation (e.g., visible or invisible light (e.g., IR light)), and in some cases may include an array of light sources 734, such as an array of IR light sources (e.g., IR VCSELs, VECSELs, or LEDs (e.g., OLEDs, RC-LEDs, mLEDs, or SLEDs), and so on). Different ones or the light sources 734 may be separately controllable by the processor 714 (e.g., separately addressed, activated, deactivated, or adjusted), so that optical transmissions made by the different light sources may be made at the same or different times and may include the same or different signals or data.

The optical receiver 708 may receive electromagnetic radiation, and in some cases may include an array of photodetectors 736. Different ones of the photodetectors 736 may be separately addressable by the processor 714, so that light may be separately received, and charge may be separately integrated, by the different photodetectors 736.

A set of transmit beam shaping optics 738 may be disposed over the optical transmitter 706, and a set of receive beam collection optics 740 may be disposed over the optical receiver 708. In some embodiments, some or all of the optics included in the set of transmit beam shaping optics 738 and the set of receive beam collection optics 740 may be mounted in apertures within a frame component 742 attached to the substrate 732. In other embodiments (not shown), some or all of the optics included in the set of transmit beam shaping optics 738 and the set of receive beam collection optics 740 may be incorporated into (i.e., formed in or included in) a monolithic dielectric (i.e., a single structure). One or more electrical interlocks, such as electrical interlocks 766 and 768, may be provided between the substrate 732 and the set of transmit beam shaping optics 738. In this manner, should the set of transmit beam shaping optics 738 become dislodged from the substrate 732 and light emitted by the light sources 734 potentially represent an eye hazard, the dislodgement may be detected and the light sources 734 may be powered down immediately upon the dislodgement being detected.

In some embodiments, the set of transmit beam shaping optics 738 may include faceted micro-optics, diffractive optical elements, or other optic elements. The set of transmit beam shaping optics 738 may cause the electromagnetic radiation emitted by different light sources to be emitted into different acute angular transmission spaces 716. In some embodiments, the set of transmit beam shaping optics 738 may include an anamorphic lens having different focal lengths and working distances in orthogonal directions (e.g., horizontal and vertical directions). The different focal lengths and working distances may, together with the emission area of the light sources 734, define the acute angular transmission spaces 716 described with reference to FIG. 7A. In some cases, the working distances of the anamorphic lens may be set to about 0.6-0.8× of the focal lengths to achieve a "soft-image" for the optical transmitter 706 near field. This may enable a well-defined uniform illumination, independent of optical variation in the optical transmitter 706, to be obtained far field.

In some embodiments, the set of receive beam collection optics 740 may include a condenser lens 744. The condenser lens 744, and/or a lens 746 having a concave light-receiving surface (e.g., a field flat optic filter), which lens 746 is positioned between the condenser lens 744 and the array of photodetectors 736, may cause light received at different sets of incident angles on the light-receiving surface of the condenser lens 744 to be diverted to different photodetectors 736. The light received at the different sets of incident angles is light received in different ones of the acute angular reception spaces. In some embodiments, the set of receive beam collection optics 740 may include an aspheric lens having a high numerical aperture. The aspheric lens may have a positive optical power (e.g., a strong positive optical power) on a light-receiving surface, and a negative optical power (e.g., a moderate negative optical power) on a light-emitting surface. The strong positive optical power on the light-receiving surface of the aspheric lens may convert incident angles of light received on the light-receiving surface to different photodetectors in the array of photodetectors 736. The moderate negative optical power on the light-emitting surface of the aspheric lens may correct for field aberration.

The array of photodetectors 736 may include (or be associated with) a narrow-band spectral filter that targets (passes) a wavelength of electromagnetic radiation emitted by the array of light sources 734. The narrow-band spectral filter may be in the optical receive path of the optical receiver 708 (or array of photodetectors 736). When the set of receive beam collection optics 740 includes an aspheric lens (or in other embodiments), the array of photodetectors 736 may be placed at a distance shorter than the focal plane of the aspheric lens, to minimize field aberration.

Figure 7C:
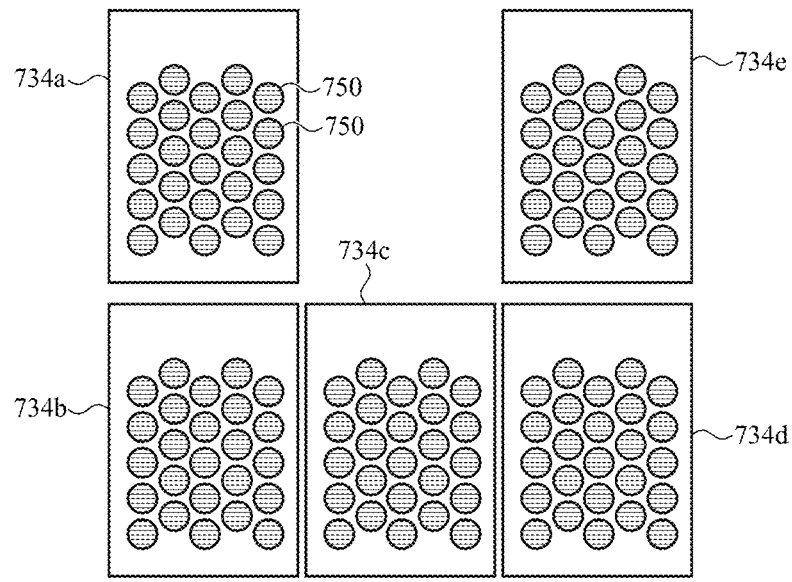
FIG. 7C shows an example layout (i.e., a plan view) of the array of light sources in the optical transmitter described with reference to FIG. 7B.

FIG. 7C shows an example layout (i.e., a plan view) of the array of light sources 734 in the optical transmitter 706 described with reference to FIG. 7B. Each light source 734a, 734b, 734c, 734d, and 734e may include an array of point light sources 750, such as an array of IR VCSELs. The point light sources 750 may be arranged in staggered columns, as shown, or in other patterns.

Figure 7D:
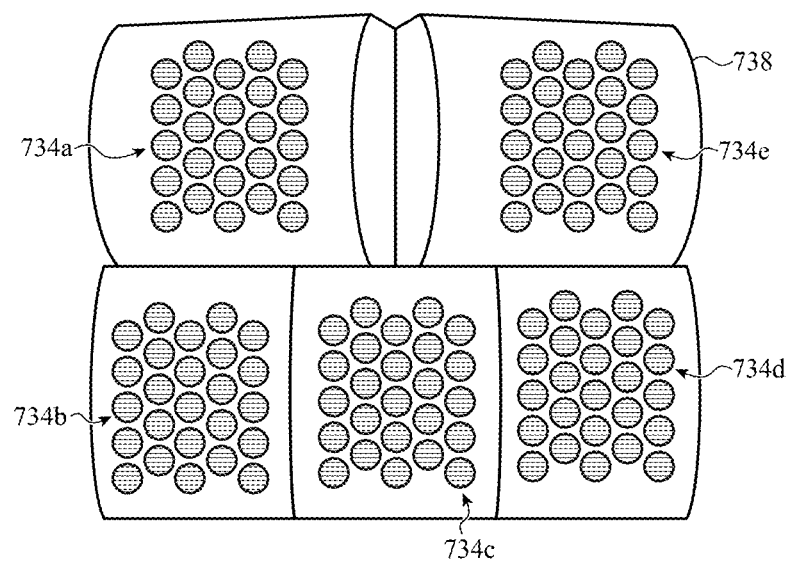
FIG. 7D shows an example set of transmit beam shaping optics disposed over the array of light sources.
Figure 7E:
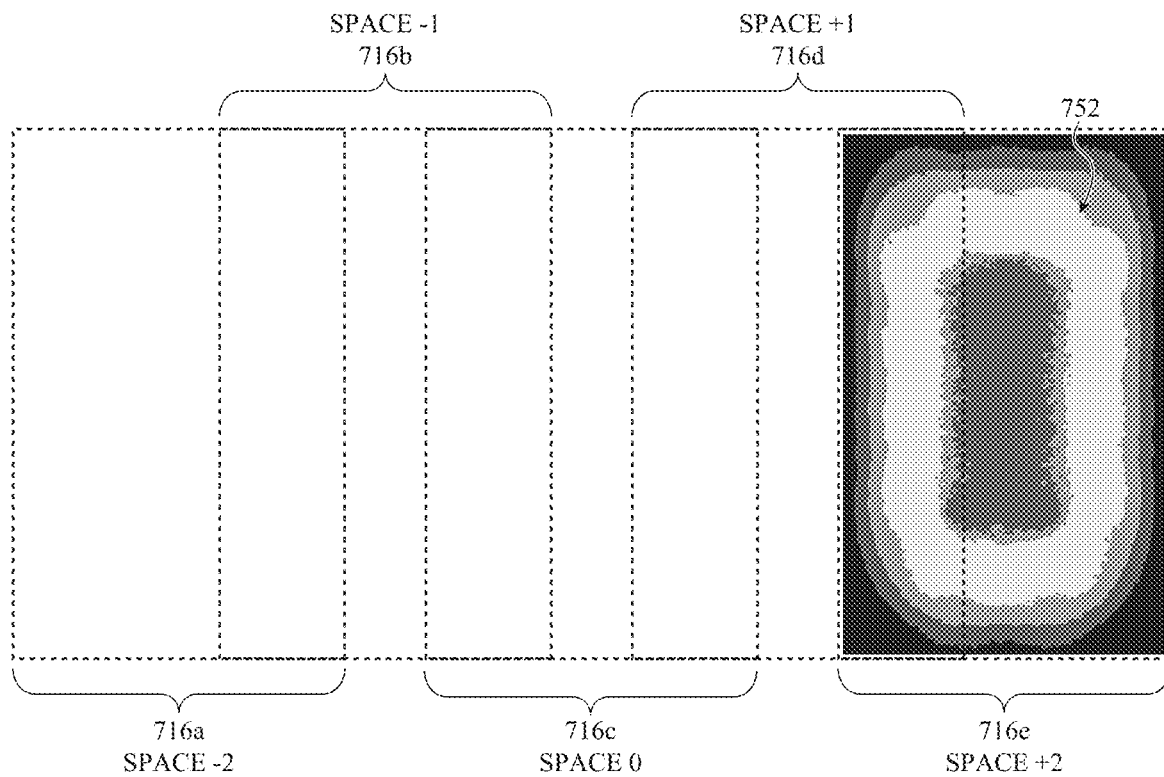
FIG. 7E shows an example projection of a set of acute angular transmission spaces in a far field, and shows an electromagnetic radiation distribution pattern produced in one of the acute angular transmission spaces, by a light source associated with one of the acute angular transmission spaces.

FIG. 7D shows an example set of transmit beam shaping optics 738 disposed over the array of light sources 734. The set of transmit beam shaping optics 738 may cause the electromagnetic radiation emitted by different light sources 734 to be emitted into different acute angular transmission spaces 716 (e.g., the acute angular transmission spaces 716a, 716b, 716c, 716d, and 716e), as shown in FIG. 7E. An example far-field electromagnetic radiation distribution pattern 752 that may be produced by one combination of a light source 734 in the optical transmitter 706 and the set of transmit beam shaping optics 738 is shown in FIG. 7E. The far-field electromagnetic radiation distribution pattern 752 may have a high aspect ratio, with light diverging to a greater extent in one direction (e.g., a vertical direction) than in an orthogonal direction (e.g., a horizontal direction). By way of example, the acute angular transmission spaces 716 are shown to be partially overlapping.

Figure 7F:
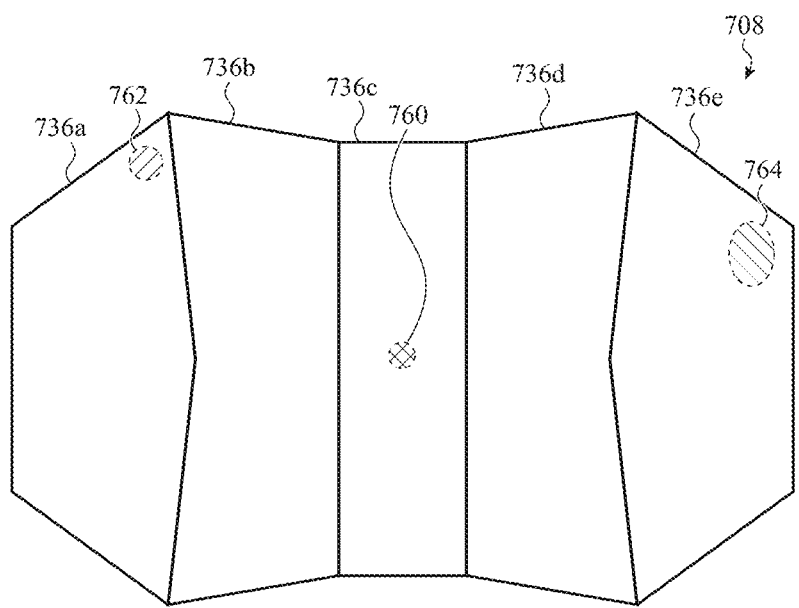
FIG. 7F shows an example layout (i.e., a plan view) of the array of photodetectors of the optical receiver described with reference to FIG. 7B.

FIG. 7F shows an example layout (i.e., a plan view) of the array of photodetectors 736 of the optical receiver 708 described with reference to FIG. 7B. The example layout includes photodetectors 736a, 736b, 736c, 736d, and 736e having polygonal boundaries other than rectangular or square boundaries. Different ones of the photodetectors 736 also have differently shaped boundaries. In alternative embodiments, the photodetectors may have rectangular and/or same-shape boundaries.

Figure 8:
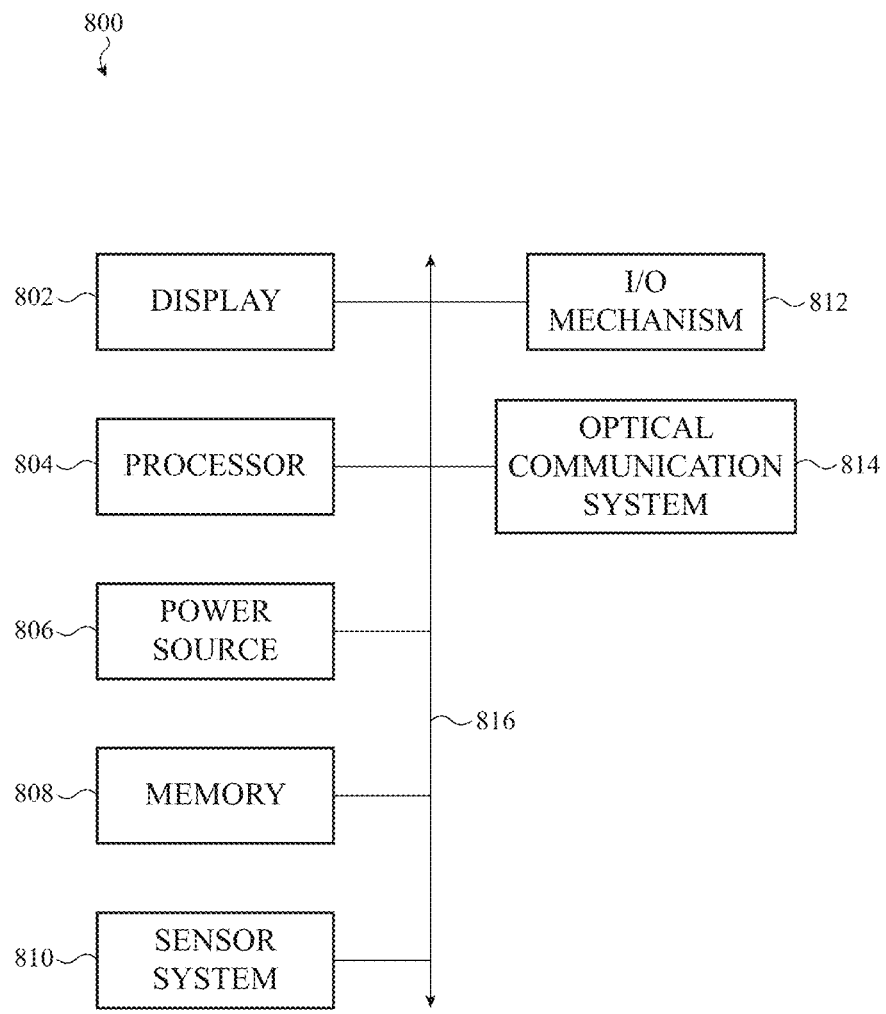
FIG. 8 shows a sample electrical block diagram of an electronic device, which electronic device may in some cases take the form of one of the devices described with reference to FIG. 1, 3A, 4, 5, or 7A.

FIG. 8 shows a sample electrical block diagram of an electronic device 800, which electronic device may in some cases take the form of one of the devices described with reference to FIG. 1, 3A, 4, 5, or 7A. The electronic device 800 may include a display 802 (e.g., a light-emitting display), a processor 804, a power source 806, a memory 808 or storage device, a sensor system 810, an input/output (I/O) mechanism 812 (e.g., an input/output device, input/output port, or haptic input/output interface), or an optical communication system 814. The processor 804 may control some or all of the operations of the electronic device 800. The processor 804 may communicate, either directly or indirectly, with some or all of the other components of the electronic device 800. For example, a system bus or other communication mechanism 816 can provide communication between the processor 804, the power source 806, the memory 808, the sensor system 810, the I/O mechanism 812, and the optical communication system 814.

The processor 804 may be implemented as any electronic device capable of processing, receiving, or transmitting data or instructions, whether such data or instructions is in the form of software or firmware or otherwise encoded. For example, the processor 804 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some embodiments, the processor 804 may function as the controller described with reference to FIG. 9 or 10.

It should be noted that the components of the electronic device 800 can be controlled by multiple processors. For example, select components of the electronic device 800 (e.g., a sensor system 810 or optical communication system 814) may be controlled by a first processor and other components of the electronic device 800 (e.g., the display 802) may be controlled by a second processor, where the first and second processors may or may not be in communication with each other.

The power source 806 can be implemented with any device capable of providing energy to the electronic device 800. For example, the power source 806 may include one or more batteries or rechargeable batteries. Additionally or alternatively, the power source 806 may include a power connector or power cord that connects the electronic device 800 to another power source, such as a wall outlet.

The memory 808 may store electronic data that can be used by the electronic device 800. For example, the memory 808 may store electrical data or content such as, for example, audio and video files, documents and applications, device settings and user preferences, timing signals, control signals, and data structures or databases. The memory 808 may include any type of memory. By way of example only, the memory 808 may include random access memory, read-only memory, Flash memory, removable memory, other types of storage elements, or combinations of such memory types.

The electronic device 800 may also include one or more sensor systems 810 positioned almost anywhere on the electronic device 800. The sensor system(s) 810 may be configured to sense one or more type of parameters, such as but not limited to, pressure on the display 802, a crown, a button, or a housing of the electronic device 800; light; touch; heat; movement; relative motion; biometric data (e.g., biological parameters) of a user; and so on. For example, the sensor system(s) 810 may include a watch crown sensor system, a heat sensor, a position sensor, a light or optical sensor, an accelerometer, a pressure transducer, a gyroscope, a magnetometer, a health monitoring sensor, and so on. Additionally, the one or more sensor systems 810 may utilize any suitable sensing technology, including, but not limited to, capacitive, ultrasonic, resistive, optical, ultrasound, piezoelectric, and thermal sensing technology. In some examples, the sensor system(s) 810 may include one or more of the sensor systems described herein.

The I/O mechanism 812 may transmit or receive data from a user or another electronic device. The I/O mechanism 812 may include a display, a touch sensing input surface, a crown, one or more buttons (e.g., a graphical user interface "home" button), one or more cameras, one or more microphones or speakers, one or more ports such as a microphone port, and/or a keyboard. Additionally or alternatively, the I/O mechanism 812 may transmit electronic signals via a communications network, such as a wireless and/or wired network connection. Examples of wireless and wired network connections include, but are not limited to, cellular, Wi-Fi, Bluetooth, IR, and Ethernet connections.

The optical communication system 814 may be an example of any of the optical communication systems described herein.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A mobile electronic device, comprising:
   an optical transmitter having an acute angular transmission space;
   an optical receiver having an acute angular reception space overlapping the acute angular transmission space;
   a motion sensor; and
   a processor configured to:
      perform an optical communication handshake with a second electronic device, using the optical transmitter and the optical receiver, when the second electronic device is within the acute angular transmission space and the acute angular reception space;
      record a posing of the mobile electronic device, using the motion sensor, when the mobile electronic device is determined to be pointing at the second electronic device while performing the optical communication handshake; and
      compare a current posing of the mobile electronic device to the recorded posing of the mobile electronic device to determine when the mobile electronic device is posed to communicate with the second electronic device.

2. The mobile electronic device of claim 1, wherein the processor is further configured to:
   provide a posing cue to a user of the mobile electronic device; wherein:
   the posing cue guides the user on how to return the mobile electronic device to the recorded posing to optically communicate with the second electronic device.

3. The mobile electronic device of claim 1, further comprising:
   a substrate on which the optical receiver and the optical transmitter are mounted; wherein:
   the optical transmitter comprises an array of infrared light sources; and
   the optical receiver comprises a photodetector.

4. The mobile electronic device of claim 1, further comprising:
   a set of transmit beam shaping optics disposed over the optical transmitter; and
   a set of receive beam collection optics disposed over the optical receiver.

5. The mobile electronic device of claim 4, further comprising:
   a monolithic dielectric including the set of transmit beam shaping optics and the set of receive beam collection optics; wherein:
   the set of transmit beam shaping optics comprises an anamorphic lens having different focal lengths and working distances in orthogonal directions, the different focal lengths and working distances in orthogonal directions at least partially defining the acute angular transmission space; and
   the set of receive beam collection optics comprises an aspheric lens having a positive optical power on an exterior surface of the monolithic dielectric and a negative optical power on an optical receiver-facing surface of the monolithic dielectric.

6. The mobile electronic device of claim 4, wherein:
   the optical receiver comprises a photodetector; and
   the set of receive beam collection optics converts incident angles of light received by the set of receive beam collection optics to different image heights on the photodetector.

7. The mobile electronic device of claim 4, wherein:
   the optical transmitter comprises a set of light sources; and
   the set of transmit beam shaping optics comprises a set of identical micro-optics, with one micro-optic in the set of identical micro-optics disposed over each light source in the set of light sources.

8. The mobile electronic device of claim 1, further comprising:
   a set of optics disposed in at least one of an optical transmit path of the optical transmitter or an optical receive path of the optical receiver;
   a narrow-band spectral filter in the optical receive path of the optical receiver; wherein:
   the set of optics provides the overlap between the acute angular transmission space and the acute angular reception space; and
   the narrow-band spectral filter passes a wavelength of electromagnetic radiation emitted by the optical transmitter.

9. A mobile electronic device, comprising:
an optical transmitter having an acute angular transmission space;
a first optical receiver having a first acute angular reception space that overlaps a first portion of the acute angular transmission space;
a second optical receiver having a second acute angular reception space that overlaps a second portion of the acute angular transmission space, the second portion different from the first portion, and the second portion partially overlapping the first portion within the acute angular transmission space;
a motion sensor; and
a processor configured to:
determine, using signals received from the first optical receiver and the second optical receiver, that a second electronic device is within the acute angular transmission space, the first acute angular reception space, and the second acute angular reception space;
perform an optical communication handshake with the second electronic device when the second electronic device is within the acute angular transmission space, the first acute angular reception space, and the second acute angular reception space;
record a posing of the mobile electronic device when the mobile electronic device is determined to be pointing at the second electronic device while performing the optical communication handshake; and
compare a current posing of the mobile electronic device to the recorded posing of the mobile electronic device to determine when the mobile electronic device is posed to communicate with the second electronic device.

10. The mobile electronic device of claim 9, wherein the processor is further configured to:
provide a posing cue to a user of the mobile electronic device; wherein:
the posing cue guides the user on how to return the mobile electronic device to the recorded posing to optically communicate with the second electronic device.

11. A mobile electronic device, comprising:
an optical transmitter having a set of multiple different acute angular transmission spaces;
an optical receiver having a set of multiple different acute angular reception spaces, each acute angular reception space overlapping one of the acute angular transmission spaces;
a motion sensor; and
a processor configured to:
perform an optical communication handshake with a second electronic device by transmitting in an acute angular transmission space including the second electronic device, and receiving in an acute angular reception space that overlaps the acute angular transmission space;
record a posing of the mobile electronic device and an identity of at least the acute angular transmission space or the acute angular reception space while performing the optical communication handshake; and
compare a current posing of the mobile electronic device to the recorded posing of the mobile electronic device to determine when the mobile electronic device is posed to communicate with the second electronic device.

12. The mobile electronic device of claim 11, wherein the processor is further configured to:
provide a posing cue to a user of the mobile electronic device; wherein:
the posing cue guides the user on how to return the mobile electronic device to the recorded posing to optically communicate with the second electronic device.

13. The mobile electronic device of claim 11, wherein the optical transmitter comprises:
an array of light sources; and
a set of transmit beam shaping optics disposed over the array of light sources; wherein:
the set of transmit beam shaping optics directs light emitted by different light sources into different acute angular transmission spaces; and
the light sources are separately controllable by the processor.

14. The mobile electronic device of claim 13, wherein the optical receiver comprises:
an array of photodetectors;
a set of receive beam collection optics disposed over the array of photodetectors; wherein:
the set of receive beam collection optics directs light received from different acute angular reception spaces to different photodetectors.

15. The mobile electronic device of claim 14, wherein the set of receive beam collection optics comprises:
a field flat optic filter disposed over the array of photodetectors; and
a condenser lens disposed over the field flat optic filter.

16. The mobile electronic device of claim 14, wherein the processor is further configured to:
determine, using signals received from at least one of the photodetectors, a proximity of the second electronic device.

17. A method performed by a first electronic device to optically communicate with a second electronic device, comprising:
performing an optical communication handshake with the second electronic device;
recording a posing of the first electronic device while performing the optical communication handshake; and
comparing a current posing of the first electronic device to the recorded posing of the first electronic device to determine when the first electronic device is posed to communicate with the second electronic device.

18. The method of claim 17, wherein performing the optical communication handshake comprises:
optically transmitting a periodic synchronization signal;
optically receiving from the second electronic device an acknowledgement of receiving the periodic synchronization signal; and
optically transmitting to the second electronic device, during a window of time allocated for the periodic synchronization signal, a second acknowledgement.

19. The method of claim 17, wherein performing the optical communication handshake comprises:
optically monitoring for a synchronization signal at a low duty cycle;
optically detecting the periodic synchronization signal during a first window of time for performing the optical monitoring;
at a second window of time for performing the optical monitoring, measuring a duration to an end of an instance of the synchronization signal;
synchronizing with the second electronic device and switching to a high duty cycle for optically communicating with the second electronic device in response to the measured duration;

optically transmitting to the second electronic device an acknowledgement of receiving the periodic synchronization signal; and optically receiving from the second electronic device, during a third window of time allocated for the periodic synchronization signal, a second acknowledgement.

20. The method of claim 17, further comprising:

providing a posing cue to a user of the first electronic device; wherein:

the posing cue guides the user on how to return the first electronic device to the recorded posing to optically communicate with the second electronic device.

21. The method of claim 17, further comprising:

receiving an identifier of the second electronic device while performing the optical communication handshake;

mapping a location of the second electronic device using the received identifier of the second electronic device and the recorded posing of the first electronic device; wherein:

the mapped location of the second electronic device is displayed on a display of the first electronic device; and the mapped location displayed on the display is updated when the first electronic device is moved.

22. The method of claim 17, further comprising:

determining a first set of timings of a first set of signals transmitted between the first electronic device and the second electronic device in a first acute angular optical communication space of the first electronic device;

determining a second set of timings of a second set of signals transmitted between the first electronic device and the second electronic device in a second acute angular optical communication space of the first electronic device; and determining from the first set of timings and the second set of timings, a distance from the first electronic device to the second electronic device.

* * * * *

UNITED STATES PATENT AND TRADEMARK OFFICE
CERTIFICATE OF CORRECTION

PATENT NO. : 10,523,318 B2
APPLICATION NO. : 16/399943
DATED : December 31, 2019
INVENTOR(S) : Tong Chen et al.

It is certified that error appears in the above-identified patent and that said Letters Patent is hereby corrected as shown below:

In the Specification

Column 7, Line 62: "a low duty cycle; optically detecting the periodic synchro-" should read as:
-- a low duty cycle; optically detecting the synchro- --

In the Claims

Column 32, Line 58 (Claim 19): "optically detecting the periodic synchronization signal" should read as: -- optically detecting the synchronization signal --

Signed and Sealed this
Twenty-first Day of July, 2020

Andrei Iancu
*Director of the United States Patent and Trademark Office*